US012624531B2

(12) United States Patent
Nishi

(10) Patent No.: US 12,624,531 B2
(45) Date of Patent: May 12, 2026

(54) DISPLAY DEVICE FOR SHOVEL, AND SHOVEL

(71) Applicant: SUMITOMO CONSTRUCTION MACHINERY CO., LTD., Tokyo (JP)

(72) Inventor: Takashi Nishi, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 173 days.

(21) Appl. No.: 18/476,818

(22) Filed: Sep. 28, 2023

(65) Prior Publication Data

US 2024/0026651 A1     Jan. 25, 2024

Related U.S. Application Data

(63) Continuation of application No. PCT/JP2022/013563, filed on Mar. 23, 2022.

(30) Foreign Application Priority Data

Mar. 29, 2021     (JP) ................................. 2021-055151

(51) Int. Cl.
| | |
|---|---|
| *E02F 9/26* | (2006.01) |
| *E02F 3/32* | (2006.01) |
| *E02F 9/22* | (2006.01) |
| *G06F 3/04817* | (2022.01) |
| *G06F 3/0483* | (2013.01) |
| *G06T 11/26* | (2026.01) |

(52) U.S. Cl.
CPC ............ *E02F 9/26* (2013.01); *G06F 3/04817* (2013.01); *G06F 3/0483* (2013.01); *G06T 11/26* (2026.01); *E02F 3/32* (2013.01); *E02F 9/2228* (2013.01); *E02F 9/2285* (2013.01); *E02F 9/2292* (2013.01); *E02F 9/2296* (2013.01)

(58) Field of Classification Search
CPC ... E02F 9/26; E02F 3/32; E02F 9/2228; E02F 9/2285; E02F 9/2292; E02F 9/2296; G06F 3/04817; G06F 3/0483; G06F 3/04845; G06F 3/04847; G06T 11/206; H04N 7/181
See application file for complete search history.

(56) References Cited

U.S. PATENT DOCUMENTS

| | | | |
|---|---|---|---|
| 2002/0015062 A1* | 2/2002 | Shimazu | ................ B60K 35/22 |
| | | | 715/772 |
| 2007/0168101 A1* | 7/2007 | Shibamori | ................ E02F 9/26 |
| | | | 701/50 |

(Continued)

FOREIGN PATENT DOCUMENTS

| | | |
|---|---|---|
| EP | 3680398 | 7/2020 |
| EP | 4001513 | 5/2022 |

(Continued)

OTHER PUBLICATIONS

International Search Report for PCT/JP2022/013563 mailed on Jun. 14, 2022.

*Primary Examiner* — Cao H Nguyen
(74) *Attorney, Agent, or Firm* — IPUSA, PLLC

(57) ABSTRACT

A display device for a shovel displays a screen that includes an image represented by image data captured by an imaging device included in the shovel. The screen further includes an icon image corresponding to an instruction to correct a reference value used to calculate the weight of a load object conveyed by the end attachment of the shovel.

18 Claims, 12 Drawing Sheets

(56)                    References Cited

U.S. PATENT DOCUMENTS

| | | | |
|---|---|---|---|
| 2008/0282583 A1* | 11/2008 | Koellner | E02F 9/264 |
| | | | 37/348 |
| 2014/0107897 A1 | 4/2014 | Zhu et al. | |
| 2017/0030054 A1 | 2/2017 | Okumura et al. | |
| 2019/0003155 A1 | 1/2019 | Kurogi et al. | |
| 2020/0018046 A1* | 1/2020 | Izumikawa | E02F 9/26 |

FOREIGN PATENT DOCUMENTS

| | | | |
|---|---|---|---|
| JP | H06-089550 | | 3/1994 |
| JP | 2019190074 | * | 10/2019 |
| JP | 2022-018775 | | 1/2022 |
| WO | 2016/013686 | | 1/2016 |
| WO | 2017/191853 | | 11/2017 |
| WO | 2021/010489 | | 1/2021 |

* cited by examiner

DISPLAY DEVICE FOR SHOVEL, AND SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2022/013563, filed on Mar. 23, 2022 and designating the U.S., which claims priority to Japanese Patent Application No. 2021-055151, filed on Mar. 29, 2021. The entire contents of the foregoing applications are incorporated herein by reference.

BACKGROUND

Technical Field

The present disclosure relates to display devices for shovels and to shovels.

Description of Related Art

With respect to shovels, the technique of calculating the weight of earth and sand or the like loaded in a bucket by comparing the weight of the bucket in an empty load state with the weight of the bucket after excavation is known.

SUMMARY

According to an aspect, a display device for a shovel displays a screen that includes an image represented by image data captured by an imaging device included in the shovel. The screen further includes an icon image corresponding to an instruction to correct a reference value used to calculate the weight of a load object conveyed by the end attachment of the shovel.

DETAILED DESCRIPTION

The related-art technique described above is silent with respect to a method of setting the weight of the bucket in the empty load state to be subtracted from the weight of the bucket after excavation.

According to an embodiment, the weight of an end attachment in the empty load state can be easily set.

An embodiment is described below with reference to the accompanying drawings.

Figure 1:
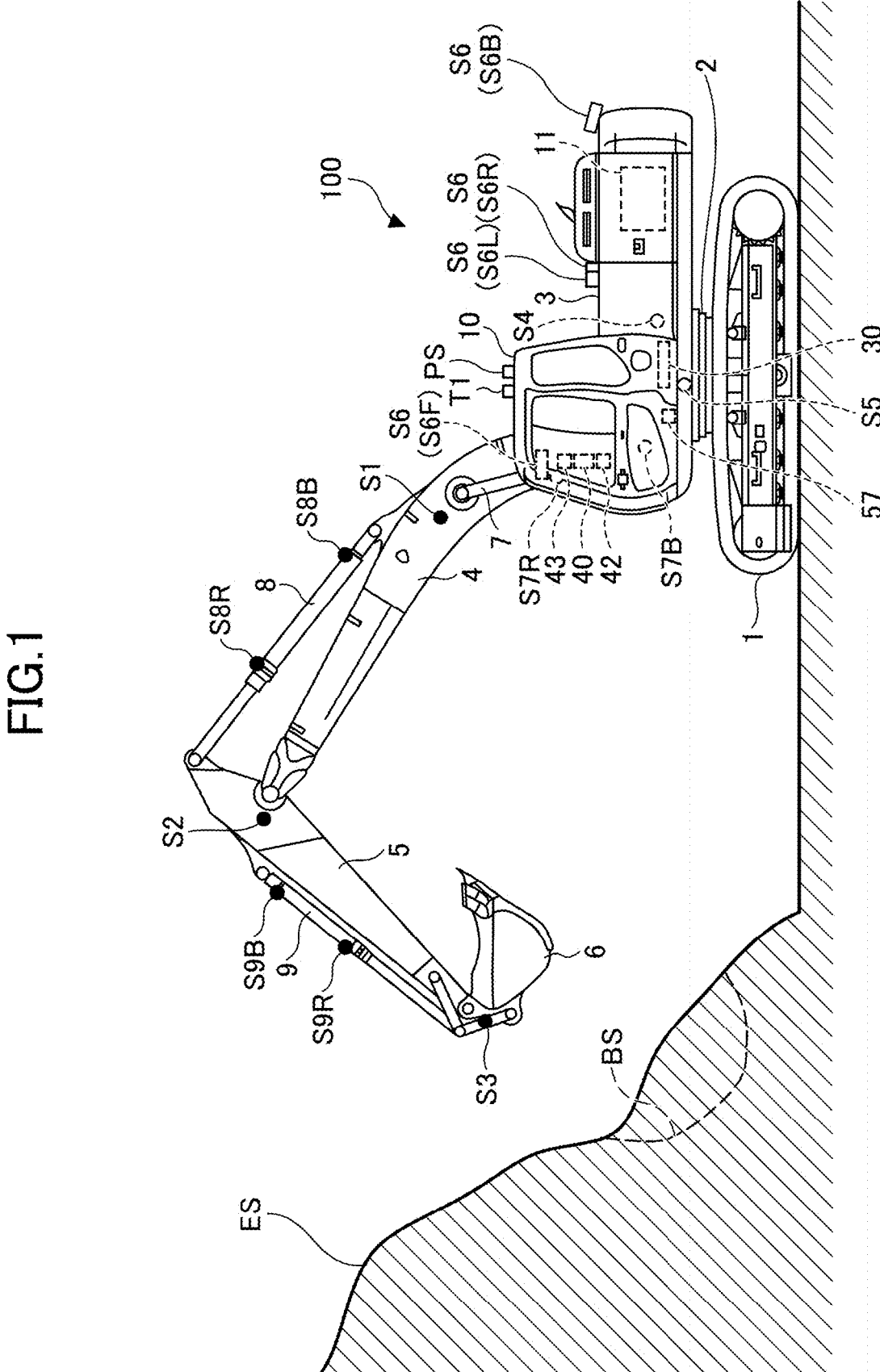
FIG. 1 is a side view of a shovel according to an embodiment.

First, an overview of a shovel 100 according to the embodiment is given with reference to FIG. 1. FIG. 1 is a side view of the shovel 100 serving as an excavator according to this embodiment.

In FIG. 1, in the shovel 100, an example of a target track BS described below is also illustrated on an upward inclined surface ES to be excavated.

The shovel 100 according to this embodiment includes a lower traveling body 1, and an upper swing body 3 which is swingable mounted on the lower traveling body 1 via a swing mechanism 2. The shovel further includes a boom 4, an arm 5, and a bucket 6 which constitutes an attachment, and a cabin 10.

The lower traveling body 1 causes the shovel 100 to travel by the pair of left and right crawlers being hydraulically driven by traveling hydraulic motors 1L, 1R (described below, see FIG. 2), respectively. That is, the pair of traveling hydraulic motors 1L, 1R (an example of a traveling motor) drives the lower traveling body 1 (crawlers) as a driven part.

The upper swing body 3 is driven by a swing hydraulic motor 2A (described below, see FIG. 2) to swing with respect to the lower traveling body 1. That is, the swing hydraulic motor 2A is a swing driving part that drives the upper swing body 3 as a driven part, and can change the orientation of the upper swing body 3.

The upper swing body 3 may be electrically driven by a motor (hereinafter referred to as a "swing motor") instead of the swing hydraulic motor 2A. That is, similarly to the swing hydraulic motor 2A, the swing motor is a swing drive part that drives the upper swing body 3 as a driven part, and can change the orientation of the upper swing body 3.

The boom 4 is pivotally attached to the front center portion of the upper swing body 3 to be able to move vertically, the arm 5 is pivotally attached to the distal end portion of the boom 4 to be able to pivot vertically, and the bucket 6 serving as an end attachment is pivotally attached to the distal end portion of the arm 5 to be able to pivot vertically. The boom 4, the arm 5, and the bucket 6 are hydraulically driven by a boom cylinder 7, an arm cylinder 8, and a bucket cylinder 9, respectively, serving as hydraulic actuators.

Note that the bucket 6 is an example of an end attachment, and another end attachment such as a slope finishing bucket, a dredging bucket, or a breaker may be attached to the distal end portion of the arm 5 instead of the bucket 6 depending on the work content or the like.

The cabin 10 is an operation room in which the operator rides, and is mounted on the front left side of the upper swing body 3.

Next, a specific configuration of the shovel 100 according to this embodiment will be described with reference to FIG. 2.

Figure 2:
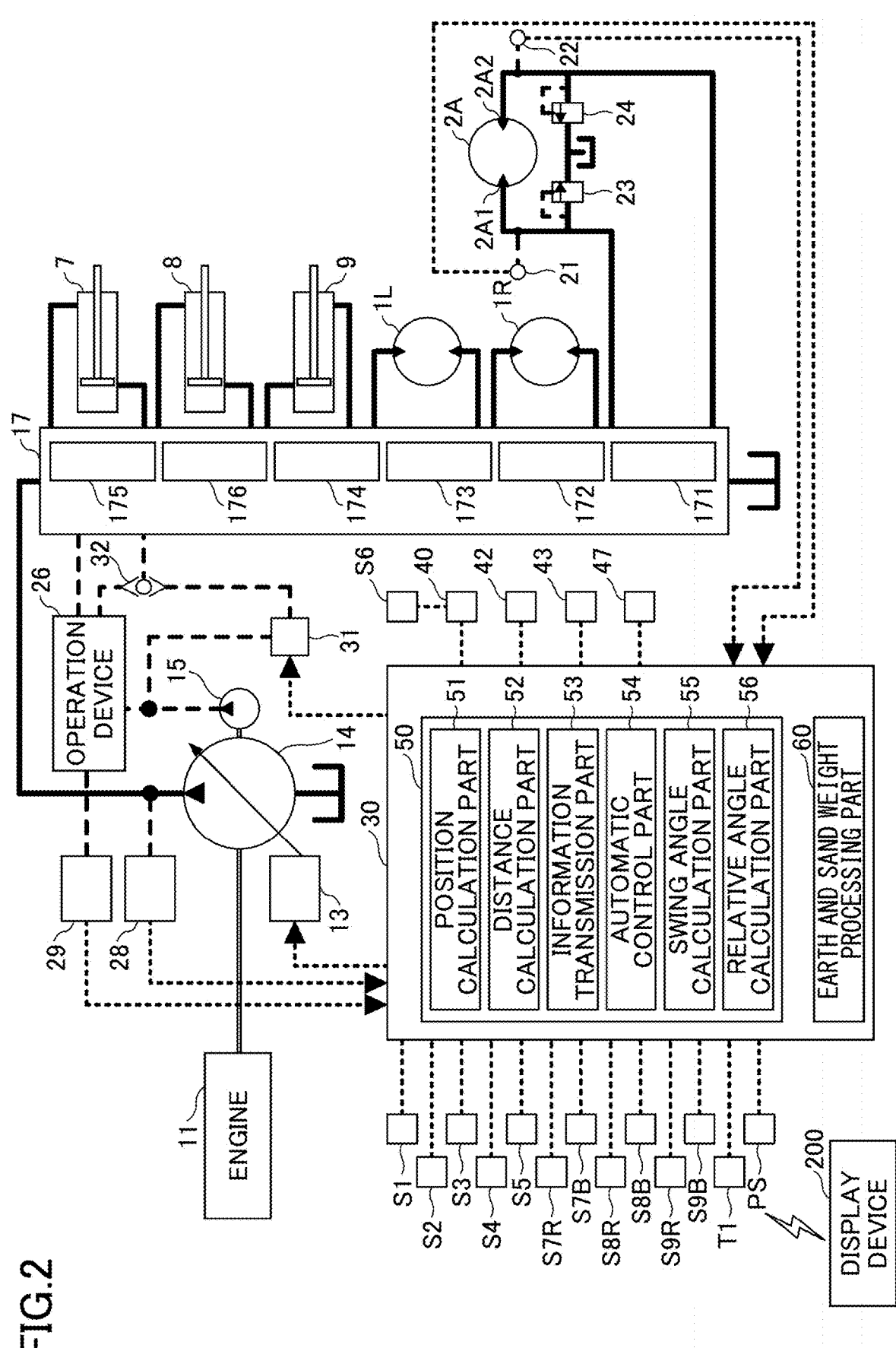
FIG. 2 is a diagram for schematically illustrating an example of a configuration of the shovel according to the embodiment.

FIG. 2 is a diagram for schematically illustrating an example of the configuration of the shovel 100 according to this embodiment.

In FIG. 2, a path for a mechanical power system, a hydraulic oil line, a pilot line, and a path for an electric control system are indicated by a double line, a solid line, a dashed line, and a dotted line, respectively.

The drive system of the shovel 100 according to this embodiment includes an engine 11, a regulator 13, a main pump 14, and a control valve unit 17. As described above, the hydraulic drive system of the shovel 100 according to this embodiment also includes hydraulic actuators such as the traveling hydraulic motors 1L, 1R, the swing hydraulic motor 2A, the boom cylinder 7, the arm cylinder 8, and the bucket cylinder 9 that hydraulically drive the lower traveling body 1, the upper swing body 3, the boom 4, the arm 5, and the bucket 6, respectively.

The engine 11 is a main power source in the hydraulic drive system, and is mounted on the rear portion of the upper swing body 3, for example. Specifically, the engine 11 constantly rotates at a predetermined target speed under direct or indirect control of a controller 30 (control part) described below to drive the main pump 14 and a pilot pump 15. The engine 11 is, for example, a diesel engine fueled with diesel fuel.

The regulator 13 controls the discharge amount of the main pump 14. For example, the regulator 13 adjusts an angle (tilt angle) of a swash plate of the main pump 14 in response to a control command from the controller 30. The regulator 13 include, for example, regulators 13L, 13R as will be described below.

The main pump 14 is mounted on, for example, the rear portion of the upper swing body 3 in the same manner as the engine 11, and supplies hydraulic oil to the control valve unit 17 through a high-pressure hydraulic line. As described above, the main pump 14 is driven by the engine 11. The main pump 14 is, for example, a variable displacement hydraulic pump, and as described above, under the control of the controller 30, the regulator 13 adjusts the tilt angle of the swash plate, thereby adjusting the stroke length of the piston and controlling the discharge flow rate (discharge pressure). The main pump 14 includes, for example, main pumps 14L, 14R as will be described below.

The control valve unit 17 is, for example, a hydraulic control device that is mounted in the central portion of the upper swing body 3 and controls the hydraulic drive system according to an operation performed on an operation device 26 by the operator. As described above, the control valve unit 17 is connected to the main pump 14 via the high-pressure hydraulic line, and selectively supplies the hydraulic oil supplied from the main pump 14 to the hydraulic actuators (the traveling hydraulic motors 1L, 1R, the swing hydraulic motor 2A, the boom cylinder 7, the arm cylinder 8, and the bucket cylinder 9) according to the operation state of the operation device 26.

Specifically, the control valve unit 17 includes control valves 171 to 176 that each controls the flow rate and the flow direction of the hydraulic oil supplied from the main pump 14 to the respective hydraulic actuators. More specifically, the control valve 171 corresponds to the traveling hydraulic motor 1L, the control valve 172 corresponds to the traveling hydraulic motor 1R, and the control valve 173 corresponds to the swing hydraulic motor 2A.

Furthermore, the control valve 174 corresponds to the bucket cylinder 9, the control valve 175 corresponds to the boom cylinder 7, and the control valve 176 corresponds to the arm cylinder 8. The control valve 175 includes, for example, control valves 175L, 175R as will be described below, and the control valve 176 includes, for example, control valves 176L, 176R as will be described below. Details of the control valves 171 to 176 will be described below.

The operation system of the shovel 100 according to this embodiment includes the pilot pump 15 and the operation device 26. The operation system of the shovel 100 also includes a shuttle valve 32 for a configuration related to a machine control function by the controller 30 described below.

The pilot pump 15 is mounted on the rear portion of the upper swing body 3, for example, and supplies a pilot pressure to the operation device 26 via a pilot line. The pilot pump 15 is, for example, a fixed displacement hydraulic pump, and is driven by the engine 11 as described above.

The operation device 26 is provided in the vicinity of the operator's seat in the cabin 10, and is an operation input device for an operator to operate various operation elements (the lower traveling body 1, the upper swing body 3, the boom 4, the arm 5, the bucket 6, and the like).

In other words, the operation device 26 is operation input device for the operator to operate the hydraulic actuators (that is, the traveling hydraulic motors 1L, 1R, the swing hydraulic motor 2A, the boom cylinder 7, the arm cylinder 8, the bucket cylinder 9, and the like) that drive the respective operating elements.

The operation device 26 is connected to the control valve unit 17 directly through a pilot line on the secondary side thereof or indirectly through the shuttle valve 32 described below provided in the pilot line on the secondary side. Thus, a pilot pressure corresponding to the operation states of the lower traveling body 1, the upper swing body 3, the boom 4, the arm 5, the bucket 6, and the like in the operation device 26 can be input to the control valve unit 17.

The control valve unit 17 can therefore drive each hydraulic actuator according to the operation states of the driven parts of the operation device 26. The operation device 26 includes, for example, a lever device that operates the arm 5 (arm cylinder 8). The operation device 26 also includes, for example, lever devices 26A to 26C that operate the boom 4 (boom cylinder 7), the bucket 6 (bucket cylinder 9), and the upper swing body 3 (swing hydraulic motor 2A) (see FIG. 4). Furthermore, the operation device 26 includes, for example, a lever device or a pedal device that operates each of the pair of left and right crawlers (traveling hydraulic motors 1L, 1R) of the lower traveling body 1.

The shuttle valve 32 has two inlet ports and one outlet port, and outputs, from the outlet port, a hydraulic oil having the higher pilot pressure of the pilot pressures input to the two inlet ports. One of the two inlet ports of the shuttle valve 32 is connected to the operation device 26 and the other is connected to a proportional valve 31.

The outlet port of the shuttle valve 32 is connected to a pilot port of the corresponding control valve in the control valve unit 17 through the pilot line (see FIG. 4 for details). Therefore, the shuttle valve 32 can apply the higher pilot pressure between the pilot pressure generated by the operation device 26 and the pilot pressure generated by the proportional valve 31 to the pilot port of the corresponding control valve.

That is, the controller 30 described below causes the proportional valve 31 to output a pilot pressure higher than the secondary-side pilot pressure output from the operation device 26, thereby controlling the corresponding control valve and controlling the operations of the various operating elements regardless of the operations of the operation device

26 by the operator. The shuttle valve 32 includes, for example, shuttle valves 32AL, 32AR, 32BL, 32BR, 32CL, 32CR, as will be described below.

Note that the operation device 26 (a left operation lever, a right operation lever, a left traveling lever, and a right traveling lever) may not be a hydraulic pilot type that outputs a pilot pressure but may be an electric type that outputs an electric signal.

In such a case, the electric signal from the operation device 26 is input to the controller 30, and the controller 30 controls each of the control valves 171 to 176 in the control valve unit 17 in accordance with the input electric signal, thereby driving the respective various hydraulic actuators according to the content of the operation with respect to the operation device 26.

For example, the control valves 171 to 176 in the control valve unit 17 may be solenoid type spool valves that are driven in response to commands from the controller 30. Furthermore, for example, between the pilot pump 15 and the pilot port of each of the control valves 171 to 176, a solenoid valve that operates in accordance with an electric signal from the controller 30 may be disposed.

In such a manual operation using the electric operation device 26 is performed, the controller can operate each of the control valves 171 to 176 according to the content of the operation with respect to the operation device 26 by controlling the solenoid valve to increase or decrease the pilot pressure by an electric signal corresponding to the operation amount of the manual operation (for example, lever operation amount).

The control system of the shovel 100 according to this embodiment includes the controller 30, a discharge pressure sensor 28, an operation pressure sensor 29, the proportional valve 31, a display device 40, an input device 42, a sound output device 43, a storage device 57, a boom angle sensor S1, an arm angle sensor S2, a bucket angle sensor S3, a vehicle body inclination sensor S4, a swing state sensor S5, an imaging device S6, a positioning device PS, and a communication device Tl.

The controller 30 (an example of the control device) is provided in the cabin 10, for example, and performs drive control with respect to the shovel 100. The functions of the controller 30 may be implemented by any given hardware, software, or any combination thereof. For example, the controller 30 is mainly constituted by a microcomputer including one or more processors such as a central processing unit (CPU), a read only memory (ROM), a random access memory (RAM), a nonvolatile auxiliary storage device, various input/output interface devices, and the like. The controller 30 performs various functions by, for example, executing various programs stored in the ROM or the nonvolatile auxiliary storage device by the CPU.

For example, the controller 30 sets a target rotation speed based on a work mode or the like set in advance by a predetermined operation of an operator or the like, and performs drive control to rotate the engine 11 at a constant speed.

The controller 30 also outputs, for example, a control command to the regulator 13 as necessary to change the discharge amount of the main pump 14.

Furthermore, the controller 30 performs, for example, control related to a machine guidance function of guiding a manual operation of the shovel 100 through the operation device 26 by an operator. The controller 30 performs, for example, control related to a machine control function of automatically assisting a manual operation of the shovel 100 through the operation device 26 by an operator.

That is, the controller 30 includes a machine guidance part 50 as a functional part related to the machine guidance function and the machine control function. The controller 30 includes an earth and sand weight processing part 60 described below.

Note that a part of the functions of the controller 30 may be performed by other controllers (control devices). That is, the functions of the controller 30 may be performed in a mode in which the functions are distributed to the multiple controllers. For example, the machine guidance function and the machine control function may be performed by a dedicated controller (control device).

The discharge pressure sensor 28 detects a discharge pressure of the main pump 14. A detection signal corresponding to the discharge pressure detected by the discharge pressure sensor 28 is taken into the controller 30. The discharge pressure sensor 28 includes, for example, discharge pressure sensors 28L, 28R as will be described below.

As described above, the operation pressure sensor 29 detects the pilot pressure on the secondary side of the operation device 26, that is, the pilot pressure corresponding to the operation state (for example, the operation content such as the operation direction and the operation amount) related to each operation element (that is, the hydraulic actuator) in the operation device 26.

A detection signal of the pilot pressure corresponding to the operation states of the lower traveling body 1, the upper swing body 3, the boom 4, the arm 5, the bucket 6, and the like in the operation device 26 by the operation pressure sensor 29 is taken into the controller 30. The operation pressure sensor 29 includes, for example, operation pressure sensors 29A to 29C as will be described below.

Instead of the operation pressure sensor 29, other sensors capable of detecting operation states related to the respective operation elements in the operation device 26, for example, encoders, potentiometers, or the like capable of detecting operation amount (tilt amount) or tilt directions of the lever devices 26A to 26C or the like may be provided.

The proportional valve 31 is provided in the pilot line connecting the pilot pump 15 and the shuttle valve 32, and is configured to be able to change a flow path area (a cross-sectional area through which the hydraulic oil can flow) of the pilot line. The proportional valve 31 operates in response to a control command input from the controller 30.

Thus, the controller 30 can supply the hydraulic oil discharged from the pilot pump 15 to the pilot port of the corresponding control valve in the control valve unit 17 via the proportional valve 31 and the shuttle valve 32, even when the operation device 26 (specifically, the lever devices 26A to 26C) is not operated by the operator. The proportional valve 31 includes, for example, proportional valves 31AL, 31AR, 31BL, 31BR, 31CL, and 31CR as will be described below.

The display device 40 is provided at a location that is easily visible to the seated operator in the cabin and displays various information images under the control of the controller 30. The display device 40 may be connected to the controller 30 via an in-vehicle communication network such as a controller area network (CAN), or may be connected to the controller 30 via a one-to-one dedicated line.

The input device 42 is provided within reach of an operator seated in the cabin 10, receives various operation inputs from the operator, and outputs a signal corresponding to the operation input to the controller 30. The input device 42 includes a touch panel mounted on a display of the display device 40 that displays various information images, a knob switch provided at a tip of a lever portion of each of the lever devices 26A to 26C, a button switch provided around the display device 40, a lever, a toggle, a rotary dial, and the like. A signal corresponding to the content of an operation on the input device 42 is taken into the controller 30.

The sound output device 43 is provided in, for example, the cabin 10, connected to the controller 30, and outputs sound under the control of the controller 30. The sound output device 43 is a speaker, a buzzer, or the like, for example. The sound output device 43 outputs various information by sound in response to a sound output command from the controller 30.

The storage device 57 is provided in the cabin 10, for example, and stores various information under the control of the controller 30. The storage device 57 is, for example, a nonvolatile storage medium such as a semiconductor memory. The storage device 57 may store information output by various devices during the operations of the shovel 100 or may store information acquired via various devices before the operations of the shovel 100 is started.

For example, the storage device 57 may store date related to the target construction surface that is acquired via the communication device Ti or the like or set through the input device 42 or the like. The target construction surface may be set (stored) by an operator of the shovel 100 or may be set by a construction manager or the like.

The boom angle sensor S1 is attached to the boom 4, and detects an elevation angle (hereinafter referred to as a "boom angle") of the boom 4 with respect to the upper swing body 3, for example, an angle formed by a straight line connecting supporting points at both ends of the boom 4 with respect to a swing plane of the upper swing body 3 in a side view. The boom angle sensor S1 may include, for example, a rotary encoder, an accelerometer, a six-axis sensor, an inertial measurement unit (IMU), or the like.

The boom angle sensor S1 may include a potentiometer using a variable resistor, a stroke sensor that detects stroke amount of the hydraulic cylinder (boom cylinder 7) corresponding to boom angle, and the like. Hereinafter, the same applies to the arm angle sensor S2 and the bucket angle sensor S3. A detection signal corresponding to the boom angle detected by the boom angle sensor S1 is taken into the controller 30.

The arm angle sensor S2 is attached to the arm 5 and detects a rotation angle (hereinafter referred to as an "arm angle") of the arm 5 with respect to the boom 4, for example, an angle formed by a straight line connecting the supporting points at both ends of the arm 5 with respect to a straight line connecting the supporting points at both ends of the boom 4 in a side view. A detection signal corresponding to the arm angle detected by the arm angle sensor S2 is taken into the controller 30.

The bucket angle sensor S3 is attached to the bucket 6, and detects a rotation angle (hereinafter, referred to as a "bucket angle") of the bucket 6 with respect to the arm 5, for example, an angle formed by a straight line connecting a supporting point and a tip (cutting edge) of the bucket 6 with respect to a straight line connecting supporting points at both ends of the arm 5 in a side view. A detection signal corresponding to the bucket angle detected by the bucket angle sensor S3 is taken into the controller 30.

The vehicle body inclination sensor S4 detects an inclination state of the vehicle body (the upper swing body 3 or the lower traveling body 1) with respect to a horizontal plane. The vehicle body inclination sensor S4 is attached to the upper swing body 3, for example, and detects inclination angles of the shovel 100 (that is, the upper swing body 3) about two axes in the front-rear direction and the left-right direction (hereinafter referred to as "front-rear inclination angle" and "left-right inclination angle").

The vehicle body inclination sensor S4 may include, for example, a rotary encoder, an accelerometer, a six-axis sensor, an IMU, or the like. A set of detection signals corresponding to the inclination angles (front-rear inclination angle and left-right inclination angle) detected by the vehicle body inclination sensor S4 is taken into the controller 30.

The swing state sensor S5 outputs detection information related to a swing state of the upper swing body 3. The swing state sensor S5 detects, for example, a swing angular velocity and a swing angle of the upper swing body 3. The swing state sensor S5 may include, for example, a gyro sensor, a resolver, a rotary encoder, or the like. A set of detection signals corresponding to the swing angle and the swing angular velocity of the upper swing body 3 detected by the swing state sensor S5 is taken into the controller 30.

The imaging device S6 as a space recognition device captures images of the periphery of the shovel 100. The imaging device S6 include a camera S6F that captures images of the front side of the shovel 100, a camera S6L that captures images of the left side of the shovel 100, a camera S6R that captures images of the right side of the shovel 100, and a camera S6B that captures images of the rear side of the shovel 100. The imaging device S6 may include an attachment camera attached to the attachment.

The camera S6F is mounted, for example, on the ceiling of the cabin 10, that is, inside the cabin 10. The camera S6F may also be attached to the outside of the cabin such as the roof of the cabin 10 or the side surface of the boom 4. The camera S6L is attached to the left end of the upper surface of the upper swing body 3, the camera S6R is attached to the right end of the upper surface of the upper swing body 3, and the camera S6B is attached to the rear end of the upper surface of the upper swing body 3.

Each of the cameras (cameras S6F, S6B, S6L, and S6R) of the imaging device S6 is, for example, a monocular wide-angle camera having a very wide angle of view. The imaging device S6 may also be a stereo camera, a distance image camera, or the like. An image captured by the imaging device S6 is taken into the controller 30 via the display device 40.

The imaging device S6 as the space recognition device may function as an object detection device. In such a case, the imaging device S6 may detect an object present around the shovel 100. The object to be detected may include, for example, a person (a helmet, a safety vest, or the like), an animal, a vehicle (a dump truck or the like), a construction machine, a building, a hole, or the like. The imaging device S6 may also calculate a distance from the imaging device S6 or the shovel 100 to the recognized object. The imaging device S6 as the object detection device may be, for example, a stereo camera, a distance image sensor, or the like. The imaging device S6 as the space recognition device may be configured to be able to identify at least one of a type, a position, a shape, and the like of an object around the shovel.

The space recognition device is, for example, a monocular camera having an imaging element such as a CCD or a CMOS, and outputs a captured image to the display device 40. The, the space recognition device may also be configured to calculate a distance from the space recognition device or the shovel 100 to the recognized object. Furthermore, in addition to the imaging device S6, another object detection device such as an ultrasonic sensor, a millimeter wave radar, a LIDAR, or an infrared sensor may be provided as the space recognition device.

In a case where a millimeter wave radar, an ultrasonic sensor, a laser radar, or the like is used as the space recognition device, a large number of signals (laser beams or the like) may be transmitted to the object and, by receiving the reflected signals thereof, the distance and the direction of the object may be detected from the reflected signals. In a case where the object detection device is provided, the imaging device S6 may be omitted.

Note that the imaging device S6 may be directly connected to the controller 30 so as to be able to communicate therewith.

A boom rod pressure sensor S7R and a boom bottom pressure sensor S7B are attached to the boom cylinder 7. An arm rod pressure sensor S8R and an arm bottom pressure sensor S8B are attached to the arm cylinder 8.

A bucket rod pressure sensor S9R and a bucket bottom pressure sensor S9B are attached to the bucket cylinder 9. The boom rod pressure sensor S7R, the boom bottom pressure sensor S7B, the arm rod pressure sensor S8R, the arm bottom pressure sensor S8B, the bucket rod pressure sensor S9R, and the bucket bottom pressure sensor S9B are collectively referred to as "cylinder pressure sensors".

The boom rod pressure sensor S7R detects the pressure in the rod side oil chamber of the boom cylinder 7 (hereinafter referred to as "boom rod pressure"). The boom bottom pressure sensor S7B detects the pressure in the bottom side oil chamber of the boom cylinder 7 (hereinafter referred to as "boom bottom pressure").

The arm rod pressure sensor S8R detects the pressure in the rod side oil chamber of the arm cylinder 8 (hereinafter referred to as "arm rod pressure"). The arm bottom pressure sensor S8B detects the pressure in the bottom side oil chamber of the arm cylinder 8 (hereinafter referred to as "arm bottom pressure").

The bucket rod pressure sensor S9R detects the pressure in the rod side oil chamber of the bucket cylinder 9 (hereinafter referred to as "bucket rod pressure"). The bucket bottom pressure sensor S9B detects the pressure in the bottom side oil chamber of the bucket cylinder 9 (hereinafter referred to as "bucket bottom pressure").

The positioning device PS measures the position and orientation of the upper swing body 3. The positioning device PS is, for example, a global navigation satellite system (GNSS) compass, detects the position and the orientation of the upper swing body 3. A detection signal corresponding to the position and the orientation of the upper swing body 3 is taken into the controller 30. Among the functions of the positioning device PS, the function of detecting the orientation of the upper swing body 3 may be replaced by an orientation sensor attached to the upper swing body 3.

The communication device Ti communicates with an external device such as an assist device 200 of the shovel 100 via a predetermined network including mobile communication networks, satellite communication networks, Internet networks, and the like with base stations as terminals. The assist device 200 of the shovel 100 may be used by, for example, a manager who manages a worksite where the shovel 100 is operated, or may be carried by an operator of the shovel 100. The assist device 200 may be, for example, a smartphone, a tablet-type terminal device, or the like.

The communication device Ti is, for example, a mobile communication module conforming to a mobile communication standard such as Long Term Evolution (LTE), 4th Generation (4G), or 5th Generation (5G), or a satellite communication module for connecting to a satellite communication network.

The machine guidance part 50 executes, for example, control of the shovel 100 related to the machine guidance function. For example, the machine guidance part 50 transmits work information such as a distance between the target construction surface and the distal end portion of the attachment, specifically, a distance between the target construction surface and a work portion of the end attachment, to the operator through the display device 40, the sound output device 43, or the like.

The data related to the target construction surface is stored in advance in the storage device 57, for example, as described above. The data related to the target construction surface is represented by, for example, a reference coordinate system. The reference coordinate system is, for example, the world geodetic system. The world geodetic system is a three-dimensional orthogonal XYZ coordinate system with the origin being at the center of gravity of the earth, the X-axis being in the direction of the intersection of the Greenwich meridian and the equator, the Y-axis being in the direction of 90 degrees east longitude, and the Z-axis being in the direction of the north pole.

The operator may set any points in a construction site as a reference point, and set a target track in a region to be excavated based on a relative positional relationship with the reference point through the input device 42. The set target track is a target track for excavation that is set below the ground. The work portion of the bucket 6 is, for example, a tip of the bucket 6, a back surface of the bucket 6, or the like. Here, the target track is calculated based on the shape of the ground of the excavation target region before excavation or the shape of the temporarily placed fill (the shape of the excavation target). The shape of the excavation target before excavation is acquired by the space recognition device. The shape of the excavation target before excavation may also be acquired based on the track of the tip of the bucket 6 at the time of previous excavation. The controller 30 then generates a target track to be excavated this time based on both the acquired shape of the excavation target before excavation and the excavation operation plan. Thus, the controller 30 updates the target track to be excavated every time the loading operation is performed. The controller 30 may also generate the target track so as to achieve the target weight.

In a case where, for example, a grapple or a lifting magnet is adopted as the end attachment instead of the bucket 6, the distal end portion of the grapple or the bottom surface of the lifting magnet corresponds to the work portion. The machine guidance part 50 notifies the operator of the work information through the display device the sound output device 43, or the like, and guides the operator to operate the shovel 100 through the operation device 26.

The machine guidance part 50 executes, for example, control of the shovel 100 related to a machine control function. For example, when the operator manually performs the excavation operation, the machine guidance part 50 may automatically operate at least one of the boom 4, the arm 5, and the bucket 6 such that the target track and the tip position of the bucket 6 match with each other.

The machine guidance part 50 acquires information from the boom angle sensor S1, the arm angle sensor S2, the bucket angle sensor S3, the vehicle body inclination sensor S4, the swing state sensor S5, the imaging device S6, the positioning device PS, the communication device Tl, the input device 42, and the like.

The machine guidance part 50 then automatically controls the operation of the attachment such that the distal end portion of the attachment (specifically, a work portion such as the tip or the back surface of the bucket 6) follows the target track, for example, based on the acquired information.

The machine guidance part 50 includes, as detailed functional configuration elements related to the machine guidance function and the machine control function, a position calculation part 51, a distance calculation part 52, an information transmission part 53, an automatic control part 54, a swing angle calculation part 55, and a relative angle calculation part 56.

The position calculation part 51 calculates the position of a predetermined positioning target. For example, the position calculation part 51 calculates a coordinate point in the reference coordinate system of the distal end portion of the attachment, specifically, the work portion such as the tip or the back surface of the bucket 6. Specifically, the position calculation part 51 calculates the coordinate point of the work portion of the bucket 6 from the elevation angles (the boom angle, the arm angle, and the bucket angle) of the boom 4, the arm 5, and the bucket 6.

The distance calculation part 52 calculates a distance between two positioning targets. For example, the distance calculation part 52 calculates the distance between the distal end portion of the attachment, specifically, the work portion such as the tip or the back surface of the bucket 6, and the target track. The distance calculation part 52 may also calculate an angle (relative angle) between the back surface as the work portion of the bucket 6 and the target track.

The information transmission part 53 transmits (notifies) various kinds of information to the operator of the shovel 100 through a predetermined notification device such as the display device 40 or the sound output device 43. The information transmission part 53 notifies the operator of the shovel 100 of magnitude (degrees) of the various distances and the like calculated by the distance calculation part 52.

For example, (the magnitude of) the distance between the tip portion of the bucket 6 and the target track is transmitted to the operator using at least one of the visual information by the display device 40 and the auditory information by the sound output device 43. The information transmission part 53 may transmit (the magnitude of) the relative angle between the back surface as the work part of the bucket 6 and the target track to the operator using at least one of the visual information by the display device 40 and the auditory information by the sound output device 43.

Furthermore, the information transmission part 53 may cause the display device 40 to display the magnitude of the distance between the distal end portion of the attachment, specifically, the work portion of the bucket 6 and the target track, the magnitude of the relative angle between the back surface of the bucket 6 and the target track, or the like, as the work information. Under the control of the controller 30, the display device 40 displays, for example, the work information received from the information transmission part 53 together with the image data received from the imaging device S6. The information transmission part 53 may transmit the magnitude of the vertical distance to the operator using, for example, an image of an analog meter, an image of a bar graph indicator, or the like.

The automatic control part 54 automatically assists the manual operation of the shovel 100 by the operator through the operation device 26 by automatically operating the actuator.

Specifically, the automatic control part 54 can individually and automatically adjust the pilot pressures acting on the control valves (specifically, the control valve 173, the control valves 175L, 175R, and the control valve 174) corresponding to the hydraulic actuators (specifically, the swing hydraulic motor 2A, the boom cylinder 7, and the bucket cylinder 9), as will be described below. Thus, the automatic control part 54 can automatically operate the respective hydraulic actuators.

The control related to the machine control function by the automatic control part 54 may be executed, for example, when a predetermined switch included in the input device 42 is pressed. The predetermined switch is, for example, a machine control switch (hereinafter referred to as a "Machine Control (MC) switch"), and may be disposed as a knob switch that is located at a distal end of a portion in the operation device 26 and gripped by the operator (for example, a lever device to operate the arm 5). In the following description, it is assumed that the machine control function is enabled when the MC switch is pressed.

For example, when the MC switch or the like is pressed, the automatic control part 54 automatically extends and contracts at least one of the boom cylinder 7 and the bucket cylinder 9 in accordance with the operation of the arm cylinder 8 in order to assist the excavation work and the shaping work.

Specifically, when the operator manually performs a closing operation of the arm 5 (hereinafter, referred to as an "arm closing operation"), the automatic control part 54 automatically extends and contracts at least one of the boom cylinder 7 and the bucket cylinder 9 so that the target construction surface matches the position of the work portion such as the tip or the back surface of the bucket 6. In such a case, for example, the operator can close the arm 5 while causing the tip or the like of the bucket 6 to follow the target track only by performing the arm closing operation on the lever device that corresponds to the operation of the arm 5.

Furthermore, when the MC switch or the like is pressed, the automatic control part 54 may automatically rotate the swing hydraulic motor 2A (an example of actuators) in order to cause the upper swing body 3 to face the excavation target region for which the target track is to be set.

Hereinafter, control of causing the upper swing body 3 to face the excavation target region by the controller 30 (the automatic control part 54) is referred to as "facing control". Accordingly, the operator or the like can cause the upper swing body 3 to face the excavation target region only by pressing a predetermined switch or by operating a lever device 26C described below corresponding to a swing operation in a state in which the switch is pressed. The operator can also cause the upper swing body 3 to face the excavation target region and start the machine control function related to the excavation work of the excavation target area or the like only by pressing the MC switch.

Specifically, when the lever device 26C corresponding to the swing operation is operated in a state where a predetermined switch such as the MC switch is pressed, it is determined whether or not the lever device 26C has been operated in a direction in which the upper swing body 3 faces the excavation target region.

For example, when the lever device 26C has been operated in a direction in which the tip of the bucket 6 moves away from the excavation target region, the automatic control part 54 does not execute the facing control. On the other hand, when the swing operation lever has been operated in a direction in which the tip of the bucket 6 approaches the excavation target region, the automatic control part 54 executes the facing control.

Thereby, the automatic control part 54 can operate the swing hydraulic motor 2A so as to reduce the distance (or the swing angle) between the tip of the bucket 6 and the excavation target region. When the difference therebetween becomes less than or equal to a predetermined value or becomes zero, the automatic control part 54 stops the swing hydraulic motor 2A.

Furthermore, the automatic control part 54 may set a swing angle at which the difference is less than or equal to a predetermined value or zero as a target angle, and perform operation control of the swing hydraulic motor 2A so that the angle difference between the target angle and the current swing angle (specifically, the detection value based on the detection signal of the swing state sensor S5) becomes zero. In such a case, the swing angle is, for example, an angle of the front-back axis of the upper swing body 3 with respect to the reference direction.

As described above, in a case where the swing motor is mounted on the shovel 100 instead of the swing hydraulic motor 2A, the automatic control part 54 performs the facing control with the swing motor (an example of actuators) as a control target.

The swing angle calculation part 55 calculates a swing angle of the upper swing body 3. Thus, the controller 30 can specify the current orientation of the upper swing body 3. The swing angle calculation part 55 calculates the angle of the front-back axis of the upper swing body 3 with respect to the reference direction as the swing angle based on, for example, an output signal of a GNSS compass included in the positioning device PS.

The swing angle calculation part 55 may also calculate the swing angle based on the detection signal of the swing state sensor S5. When a reference point is set on the construction site, the swing angle calculation part 55 may set a direction in which the reference point is viewed from the swing axis as the reference direction.

The pivot angle indicates the direction in which the attachment operating plane extends relative to the reference direction. The operating plane is, for example, a virtual plane that longitudinally traverses the attachment, and is disposed so as to be perpendicular to the swing plane. The swing plane is, for example, a virtual plane including the bottom surface of the swing frame perpendicular to the swing axis. For example, when the controller 30 (machine guidance part 50) determines that the attachment operating plane matches the excavation target region or the target track, the controller 30 then determines that the upper swing body 3 faces the target construction surface.

The relative angle calculation part 56 calculates a swing angle (relative angle) necessary for causing the upper swing body 3 to face the excavation target region. The relative angle is, for example, a relative angle formed between the direction of the front-back axis of the upper swing body 3 when the upper swing body 3 faces the excavation target region and the current direction of the front-back axis of the upper swing body 3. The relative angle calculation part 56 calculates the relative angle based on, for example, the data related to the excavation target region stored in the storage device 57 and the swing angle calculated by the swing angle calculation part 55.

When the lever device 26C corresponding to the swing operation is operated in a state where a predetermined switch such as the MC switch is pressed, the automatic control part 54 determines whether or not the swing operation has been performed in a direction in which the upper swing body 3 faces the excavation target region.

The automatic control part 54 sets the relative angle calculated by the relative angle calculation part 56 as the target angle if it is determined that the upper swing body 3 has been operated to swing in a direction in which the upper swing body 3 faces the excavation target region. When the change in the swing angle after the lever device 26C is operated reaches the target angle, the automatic control part 54 may determine that the upper swing body 3 faces the excavation target region and stop the motion of the swing hydraulic motor 2A.

Accordingly, the automatic control part 54 can cause the upper swing body 3 to face the excavation target region on the premise of the configuration illustrated in FIG. 2. In the above-described embodiment of the facing control, an example of the facing control for the excavation target region is described, however, the present disclosure is not limited thereto.

For example, even in the scooping operation when the temporarily placed earth and sand are loaded on the dump truck, the facing control of the swing operation may be performed so that the attachment faces the dump truck. In such a case, the excavation track is changed every time the scooping operation is performed. Therefore, after the dumping to the dump truck, the front facing control is performed with respect to the newly changed excavation track.

The swing hydraulic motor 2A includes a first port 2A1 and a second port 2A2. A hydraulic sensor 21 detects the pressure of the hydraulic oil in the first port 2A1 of the swing hydraulic motor 2A. A hydraulic sensor 22 detects the hydraulic oil in the second port 2A2 of the swing hydraulic motor 2A. A detection signal corresponding to the discharge pressures detected by the hydraulic sensors 21, 22 is taken into the controller 30.

Furthermore, the first port 2A1 is connected to a hydraulic oil tank via a relief valve 23. The relief valve 23 opens when the pressure on the first port 2A1 side reaches predetermined relief pressure, and discharges the hydraulic oil on the first port 2A1 side to the hydraulic oil tank. Similarly, the second port 2A2 is connected to the hydraulic oil tank via a relief valve 24. The relief valve 24 opens when the pressure on the second port 2A2 side reach predetermined relief pressure, and discharges the hydraulic oil on the second port 2A2 side to the hydraulic oil tank. Furthermore, it is not always necessary to perform the facing control using the machine guidance function or the machine control function. The facing operation and the excavation operation may be performed by manually by the operator.

Next, a hydraulic system of the shovel 100 according to this embodiment will be described with reference to FIG. 3.

Figure 3:
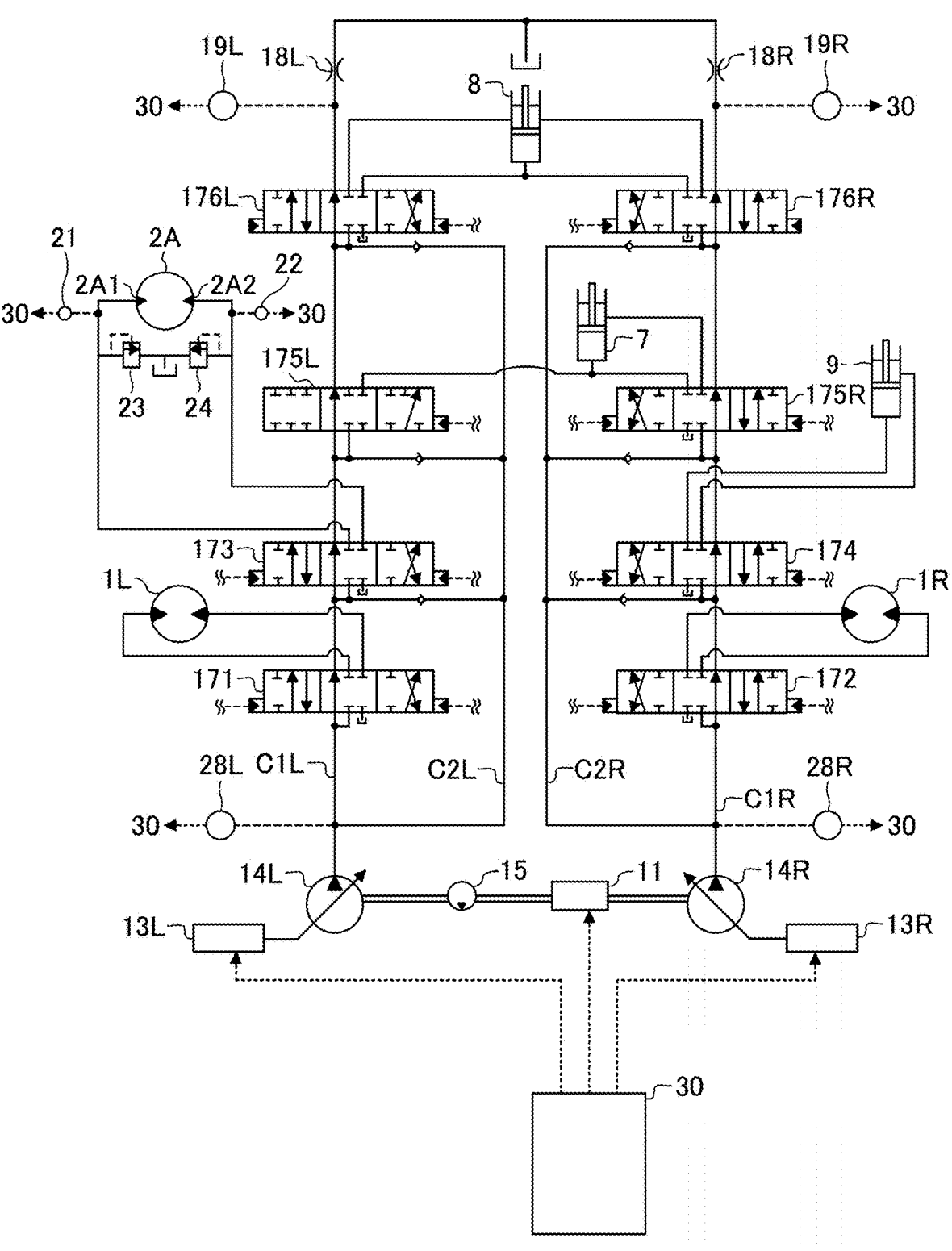
FIG. 3 is a diagram for schematically illustrating an example of a hydraulic system configuration for the shovel according to the embodiment.

FIG. 3 is a diagram for schematically illustrating an example of the hydraulic system configuration of the shovel 100 according to this embodiment.

Note that, in FIG. 3, a path for a mechanical power system, a hydraulic oil line, a pilot line, and a path for an electric control system are indicated by a double line, a solid line, a dashed line, and a dotted line, respectively, as in the case of FIG. 2 and the like.

The hydraulic system implemented by the hydraulic circuit circulates the hydraulic oil from each of the main pumps 14L, 14R driven by the engine 11 to the hydraulic oil tank via center bypass oil paths C1L, C1R and parallel oil paths C2L, C2R.

The center bypass oil path C1L starts from the main pump 14L, passes through the control valves 171, 173, 175L, and 176L arranged in the control valve unit 17 in this order, and reaches the hydraulic oil tank.

The center bypass oil path C1R starts from the main pump 14R, passes through the control valves 172, 174, 175R, and 176R arranged in the control valve unit 17 in this order, and reaches the hydraulic oil tank.

The control valve 171 is a spool valve that supplies the hydraulic oil discharged from the main pump 14L to the traveling hydraulic motor 1L and discharges the hydraulic oil discharged from the traveling hydraulic motor 1L to the hydraulic oil tank.

The control valve 172 is a spool valve that supplies the hydraulic oil discharged from the main pump 14R to the traveling hydraulic motor 1R and discharges the hydraulic oil discharged from the traveling hydraulic motor 1R to the hydraulic oil tank.

The control valve 173 is a spool valve that supplies the hydraulic oil discharged from the main pump 14L to the swing hydraulic motor 2A and discharges the hydraulic oil discharged from the swing hydraulic motor 2A to the hydraulic oil tank.

The control valve 174 is a spool valve that supplies the hydraulic oil discharged from the main pump 14R to the bucket cylinder 9 and discharges the hydraulic oil in the bucket cylinder 9 to the hydraulic oil tank.

The control valves 175L, 175R are spool valves that supply the hydraulic oil discharged from the main pumps 14L, 14R to the boom cylinder 7 and discharge the hydraulic oil in the boom cylinder 7 to the hydraulic oil tank.

The control valves 176L, 176R supply the hydraulic oil discharged from the main pumps 14L, 14R to the arm cylinder 8 and discharge the hydraulic oil in the arm cylinder 8 to the hydraulic oil tank.

In accordance with the pilot pressure acting on the pilot port, each of the control valves 171, 172, 173, 174, 175L, 175R, 176L, and 176R adjusts the flow rate of the hydraulic oil supplied to and discharged from the respective hydraulic actuators or switches the flow direction.

The parallel oil path C2L supplies the hydraulic oil of the main pump 14L to the control valves 171, 173, 175L, and 176L in parallel with the center bypass oil path C1L.

Specifically, the parallel oil path C2L is branched from the center bypass oil path C1L at the upstream side of the control valve 171, and is configured to be able to supply the hydraulic oil of the main pump 14L in parallel to each of the control valves 171, 173, 175L, and 176R. Accordingly, in a case where the flow of the hydraulic oil passing through the center bypass oil path C1L is limited or blocked by any one of the control valves 171, 173 and 175L, the parallel oil path C2L can supply the hydraulic oil to the control valve which is arranged further downstream.

The parallel oil path C2R supplies the hydraulic oil of the main pump 14R to the control valves 172, 174, 175R, and 176R in parallel with the center bypass oil path C1R. Specifically, the parallel oil path C2R is branched from the center bypass oil path C1R at the upstream side of the control valve 172, and is configured to be able to supply the hydraulic oil of the main pump 14R in parallel to each of the control valves 172, 174, 175R, and 176R. Accordingly, in a case where the flow of the hydraulic oil passing through the center bypass oil path C1R is limited or blocked by any one of the control valves 172, 174 and 175R, the parallel oil path C2R can supply the hydraulic oil to the control valve which is arranged further downstream.

The regulators 13L, 13R adjust the discharge amount of the main pumps 14L, 14R by adjusting the tilt angles of the swash plates of the main pumps 14L, 14R under the control of the controller 30.

The discharge pressure sensor 28L detects a discharge pressure of the main pump 14L, and a detection signal corresponding to the detected discharge pressure is taken into the controller 30. The same applies to the discharge pressure sensor 28R. Thus, the controller 30 can control the regulators 13L, 13R in accordance with the discharge pressures of the main pumps 14L, 14R.

The center bypass oil paths C1L, C1R are provided with throttles 18L, 18R between the most downstream control valves 176L, 176R and the hydraulic oil tank, respectively. Thus, the flow of the hydraulic oil discharged from the main pumps 14L, 14R is limited by the throttles 18L, 18R. The throttles 18L, 18R generate control pressures for controlling the regulators 13L, 13R, respectively.

Control pressure sensors 19L, 19R detect a control pressure, and a detection signal corresponding to the detected control pressure is taken into the controller 30.

The controller 30 may control the regulators 13L, 13R in accordance with the discharge pressures of the main pumps 14L, 14R detected by the discharge pressure sensors 28L, 28R to adjust the discharge amount of the main pumps 14L, 14R. For example, the controller 30 may decrease the discharge amount by controlling the regulator 13L and adjusting the swash plate tilt angle of the main pump 14L in accordance with an increase in the discharge pressure of the main pump 14L. The same applies to the regulator 13R. Thus, the controller 30 can perform the whole horsepower control of the main pumps 14L, 14R so that the absorption horsepower of the main pumps 14L, 14R represented by the product of the discharge pressure and the discharge amount does not exceed the output horsepower of the engine 11.

Furthermore, the controller 30 may adjust the discharge amount of the main pumps 14L, 14R by controlling the regulators 13L, 13R in accordance with the control pressures detected by the control pressure sensors 19L, 19R. For example, the controller 30 decreases the discharge amount of the main pumps 14L, 14R as the control pressure increases, and increases the discharge amount of the main pumps 14L, 14R as the control pressure decreases.

Specifically, in the case of a standby state (state illustrated in FIG. 3) in which none of the hydraulic actuators in the shovel 100 is operated, the hydraulic oil discharged from the main pumps 14L, 14R passes through the center bypass oil paths C1L, C1R and reaches the throttles 18L, 18R. The flow of the hydraulic oil discharged from the main pumps 14L, 14R increases the control pressures generated upstream of the throttles 18L, 18R. As a result, the controller 30 reduces the discharge amount of the main pumps 14L, 14R to the allowable minimum discharge amount, and suppresses the pumping loss when the discharged hydraulic oil passes through the center bypass oil paths C1L, C1R.

On the other hand, when any of the hydraulic actuators are operated through the operation device 26, the hydraulic oil discharged from the main pumps 14L, 14R flows into hydraulic actuators to be operated through the control valves corresponding to the hydraulic actuators to be operated.

Then, the flow of the hydraulic oil discharged from the main pumps 14L, 14R reduces or eliminates the amount of the hydraulic oil that reaches the throttles 18L, 18R, thereby reducing the control pressures generated upstream of the throttles 18L, 18R. Thereby, the controller 30 can increase the discharge amount of the main pumps 14L, 14R, circulate a sufficient amount of hydraulic oil to the hydraulic actuators to be operated, and reliably drive the hydraulic actuators to be operated.

Figure 4A:
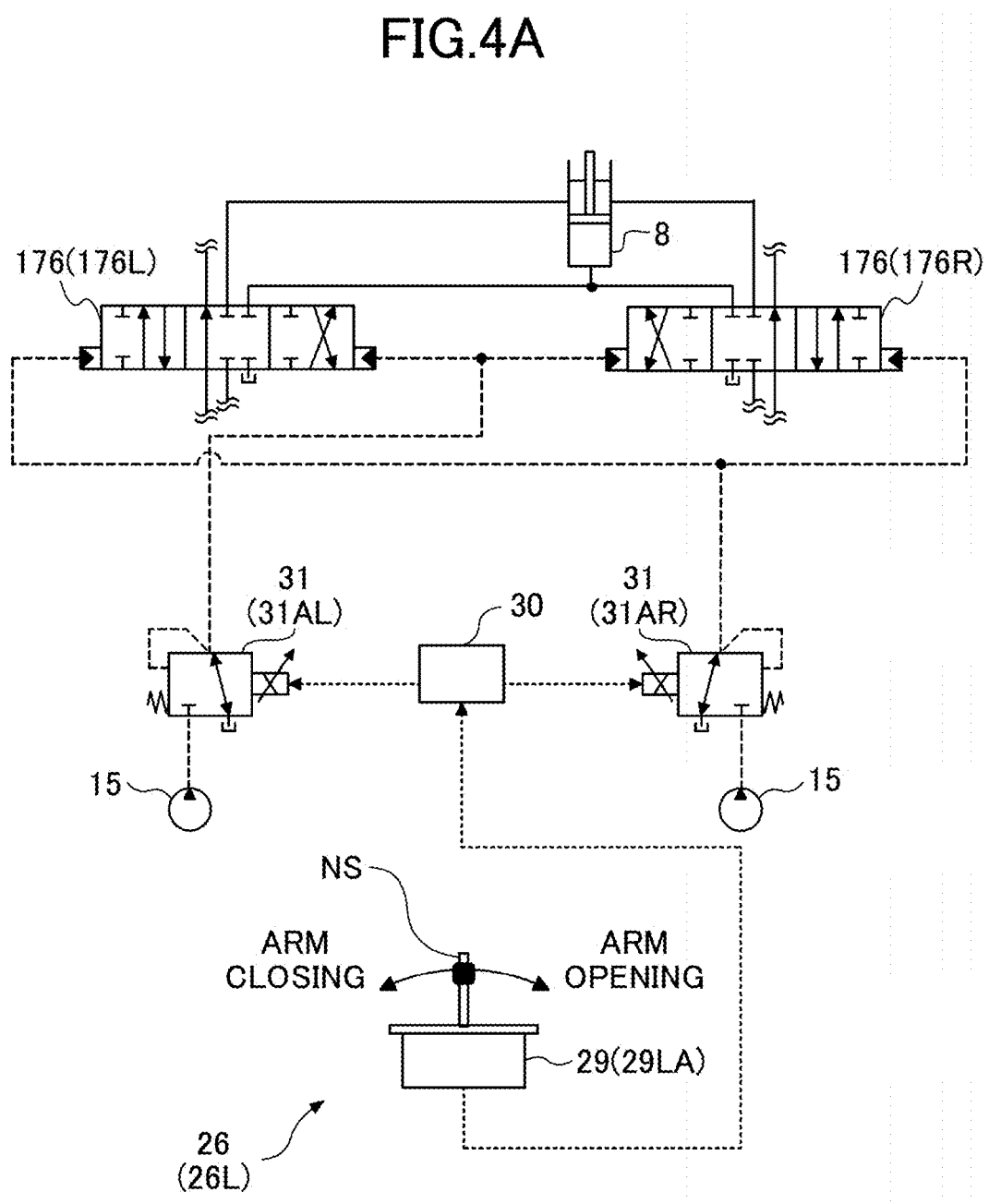
FIG. 4A is a diagram of a part of the hydraulic system related to operation of an arm cylinder.
Figure 4B:
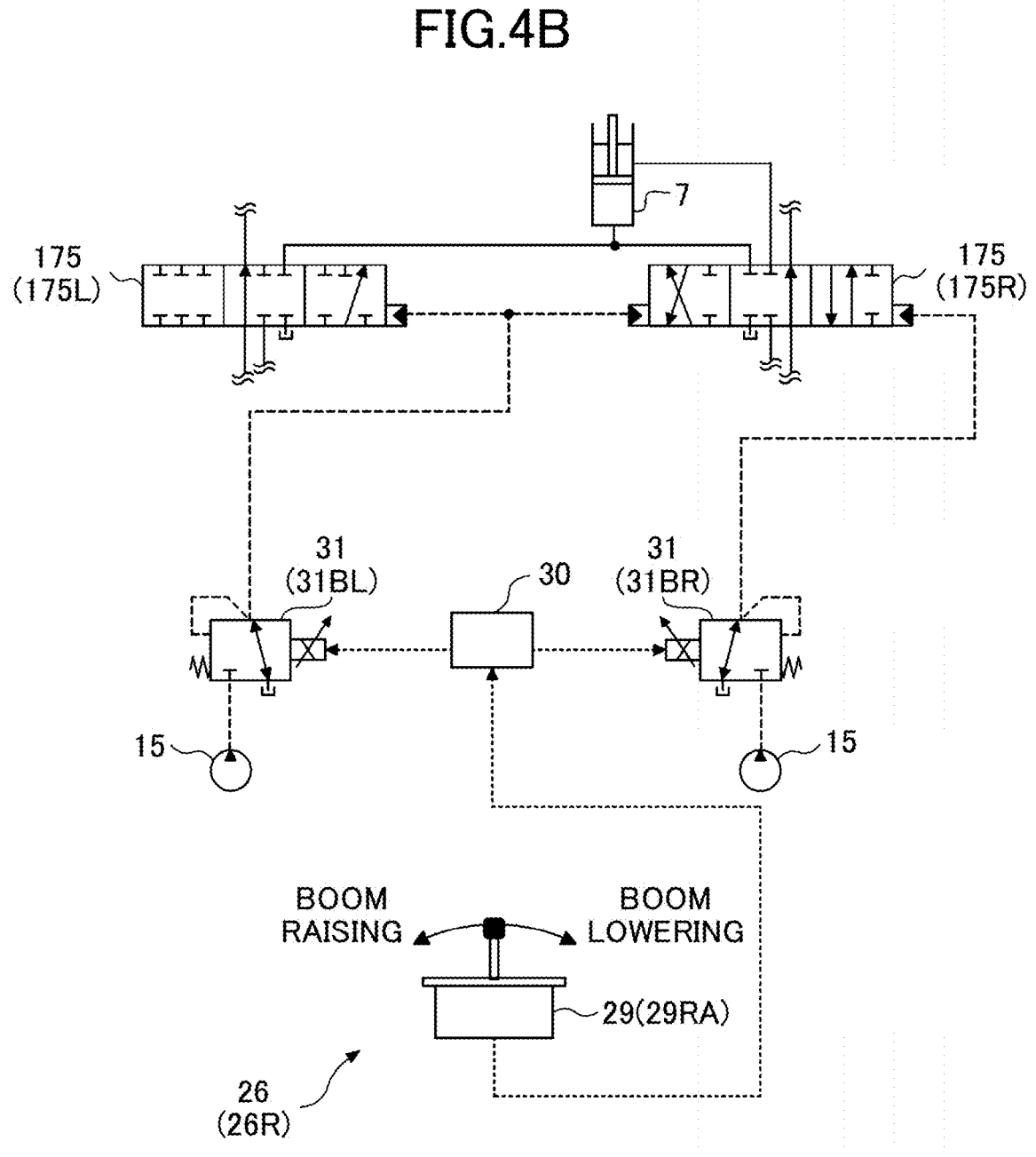
FIG. 4B is a diagram of a part of the hydraulic system related to a boom cylinder.
Figure 4C:
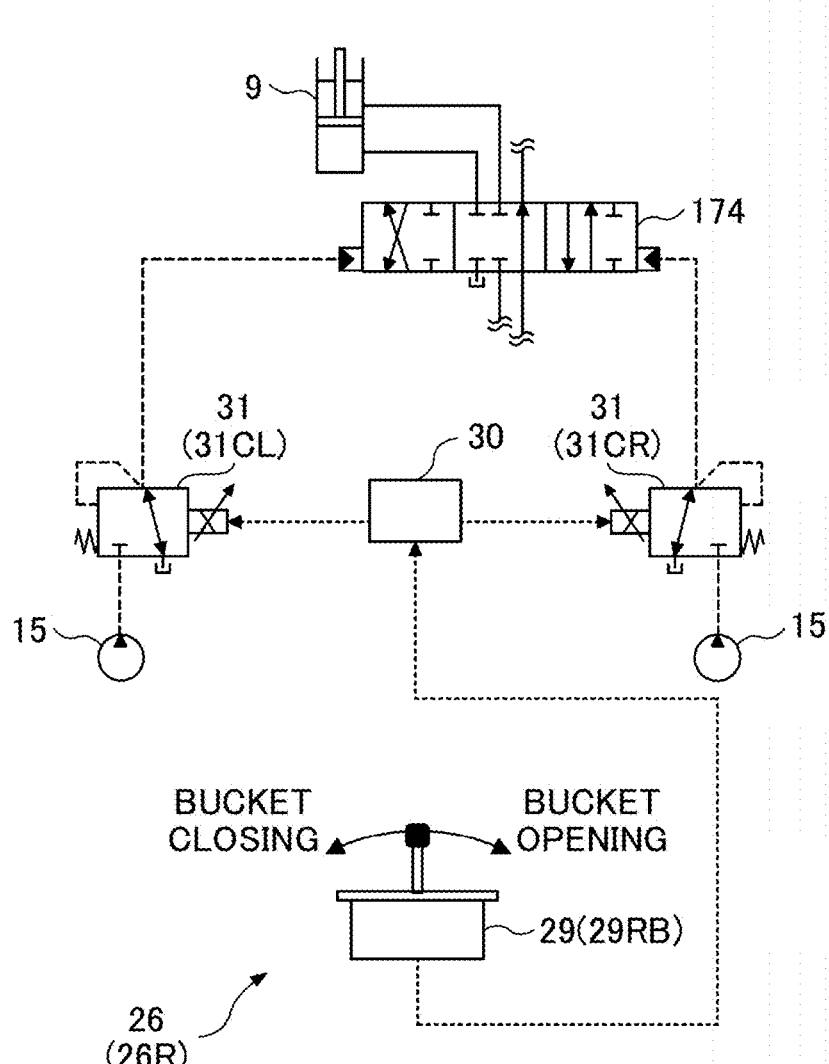
FIG. 4C is a diagram of a part of the hydraulic system related to a bucket cylinder.
Figure 4D:
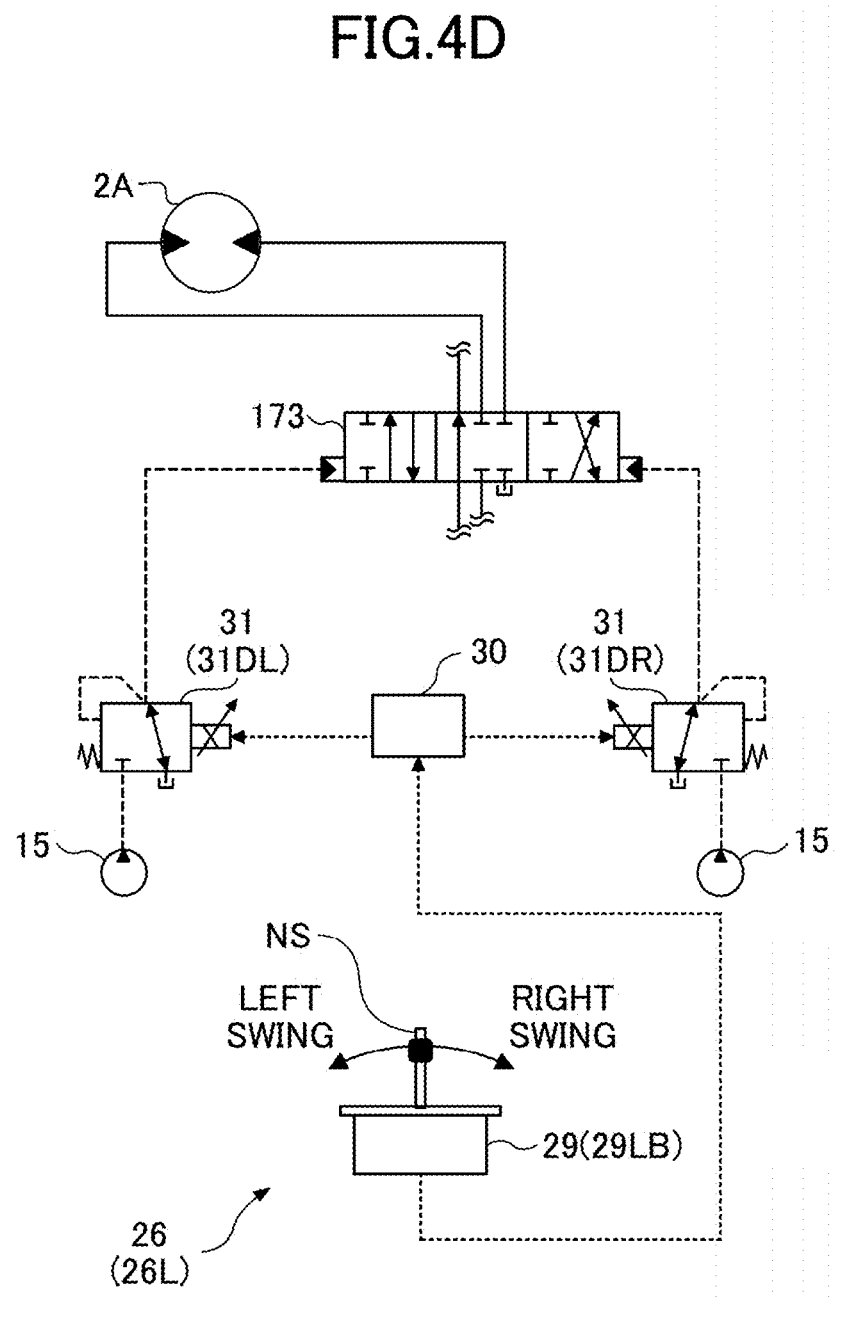
FIG. 4D is a diagram of a part of the hydraulic system related to a swing hydraulic motor.

Next, a configuration in which the controller 30 operates the actuators by the machine control function will be described with reference to the FIG. 4A to FIG. 4D. FIG. 4A to FIG. 4D are diagrams in which a part of the hydraulic system is extracted. Specifically, FIG. 4A is a diagram in which a hydraulic system part related to operations of the arm cylinder 8 is extracted, and FIG. 4B is a diagram in which a hydraulic system part related to operations of the boom cylinder 7 is extracted. FIG. 4C is a diagram in which a hydraulic system part related to operations of the bucket cylinder 9 is extracted, and FIG. 4D is a diagram in which a hydraulic system part related to operations of the swing hydraulic motor 2A is extracted.

As illustrated in the FIG. 4A to the FIG. 4D, the hydraulic system includes the proportional valve 31. The proportional valve 31 includes proportional valves 31AL to 31DL and 31AR to 31DR.

The proportional valve 31 functions as a control valve for machine control. The proportional valve 31 is disposed in a conduit connecting the pilot pump 15 and a pilot port of a corresponding control valve in the control valve unit 17, and is configured to be able to change a flow path area of the conduit. In this embodiment, the proportional valve 31 operates in response to a control command output from the controller 30.

The controller 30 can therefore supply the hydraulic oil discharged from the pilot pump 15 to the pilot port of the corresponding control valve in the control valve unit 17 via the proportional valve 31 regardless of operations of the operation device 26 by the operator. The controller 30 can then apply the pilot pressure generated by the proportional valve 31 to the pilot port of the corresponding control valve.

With this configuration, even when a specific operation device 26 is not operated, the controller 30 can operate the hydraulic actuator corresponding to the specific operation device 26. The controller 30 can also forcibly stop the operation of the hydraulic actuator corresponding to the specific operation device 26 even when a specific operation device 26 is operated.

For example, as illustrated in FIG. 4A, the left operation lever 26L is used to operate the arm 5. Specifically, the left operation lever 26L uses the hydraulic oil discharged from the pilot pump 15 to apply the pilot pressure corresponding to the operation in the front-rear direction to the pilot port of the control valve 176.

More specifically, the left operation lever 26L, if it is operated in the arm closing direction (rearward direction), applies the pilot pressure corresponding to the operation amount to the right pilot port of the control valve 176L and the left pilot port of the control valve 176R. Also, the left operation lever 26L, if it is operated in the arm opening direction (forward direction), applies the pilot pressure corresponding to the operation amount to the left pilot port of the control valve 176L and the right pilot port of the control valve 176R.

A switch NS is provided on the left operation lever 26L. In this embodiment, the switch NS is a push-button switch provided at the distal end of the left operation lever 26L. The operator can operate the left operation lever 26L while pressing the switch NS. The switch NS may be provided on the right operation lever 26R or may be provided at another position in the cabin 10.

Operation sensor 29LA detects the content of an operation performed by the operator on the left operation lever 26L in the front-rear direction, and outputs the detected value to the controller 30.

The proportional valve 31AL operates in response to a control command (current command) output from the controller 30. Then, the pilot pressure by the hydraulic oil introduced from the pilot pump 15 to the right pilot port of the control valve 176L and the left pilot port of the control valve 176R via the proportional valve 31AL is adjusted.

The proportional valve 31AR operates in response to a control command (current command) output from the controller 30. Then, the pilot pressure by the hydraulic oil introduced from the pilot pump 15 to the left pilot port of the control valve 176L and the right pilot port of the control valve 176R via the proportional valve 31AR is adjusted. The proportional valve 31AL can adjust the pilot pressure so that the control valve 176L and the control valve 176R can be stopped at any valve position. Similarly, the proportional valve 31AR can adjust the pilot pressure so that the control valve 176L and the control valve 176R can be stopped at any valve position.

With this configuration, the controller 30 can supply the hydraulic oil discharged from the pilot pump 15 to the right pilot port of the control valve 176L and the left pilot port of the control valve 176R via the proportional valve 31AL in response to the arm closing operation by the operator. The controller 30 can also supply the hydraulic oil discharged from the pilot pump 15 to the right pilot port of the control valve 176L and the left pilot port of the control valve 176R via the proportional valve 31AL regardless of the arm closing operation by the operator. That is, the controller 30 can open the arm 5 in response to the arm opening closing by the operator or regardless of the arm opening closing by the operator.

Furthermore, the controller 30 can supply the hydraulic oil discharged from the pilot pump 15 to the left pilot port of the control valve 176L and the right pilot port of the control valve 176R via the proportional valve 31AR according to the arm opening operation by the operator. The controller 30 can also supply the hydraulic oil discharged from the pilot pump 15 to the left pilot port of the control valve 176L and the right pilot port of the control valve 176R via the proportional valve 31AR regardless of the arm opening operation by the operator. That is, the controller 30 can open the arm 5 in response to the arm opening operation by the operator or regardless of the arm opening operation by the operator.

With this configuration, even when the arm closing operation is performed by the operator, the controller 30 can reduce the pilot pressure acting on the pilot port on the closing side of the control valve 176 (the left pilot port of the control valve 176L and the right pilot port of the control valve 176R) as necessary to forcibly stop the closing operation of the arm 5. The same applies to a case where the opening operation of the arm 5 is forcibly stopped when the arm opening operation is performed by the operator.

Alternatively, even when the arm closing operation is performed by the operator, the controller 30 may forcibly stop the closing operation of the arm 5 by controlling the proportional valve 31AR as necessary to increase the pilot pressures acting on the pilot ports (the right pilot port of the control valve 176L and the left pilot port of the control valve 176R) on the opening side of the control valve 176 opposite to the pilot ports on the closing side of the control valve 176 and to forcibly return the control valve 176 to the neutral position. The same applies to a case where the opening operation of the arm 5 is forcibly stopped when the arm opening operation is performed by the operator.

Although description with reference to the FIG. 4B to FIG. 4D is omitted, the same applies to a case where the operation of the boom 4 is forcibly stopped when the operator performs a boom raising operation or a boom lowering operation, a case where the operation of the bucket 6 is forcibly stopped when the operator performs a bucket closing operation or a bucket opening operation, and a case where the swing operation of the upper swing body 3 is forcibly stopped when the operator performs the swing operation. The same applies also to a case where the traveling operation of the lower traveling body 1 is forcibly stopped when the traveling operation is performed by the operator.

As illustrated in FIG. 4B, the right operation lever 26R is used to operate the boom 4. Specifically, the right operation lever 26R uses the hydraulic oil discharged from the pilot pump 15 to apply the pilot pressure corresponding to the operation in the front-rear direction to the pilot port of the control valve 175.

More specifically, the right operation lever 26R, if it is operated in the boom raising direction (rearward direction), applies the pilot pressure corresponding to the operation amount to the right pilot port of the control valve 175L and the left pilot port of the control valve 175R. Also, the right operation lever 26R, if it is operated in the boom lowering direction (forward direction), applies the pilot pressure corresponding to the operation amount to the right pilot port of the control valve 175R.

Operation sensor 29RA detects the content of an operation performed by the operator on the right operation lever 26R in the front-rear direction, and outputs the detected value to the controller 30.

The proportional valve 31BL operates in response to a control command (current command) output from the controller 30. Then, the pilot pressure by the hydraulic oil introduced from the pilot pump 15 to the right pilot port of the control valve 175L and the left pilot port of the control valve 175R via the proportional valve 31BL is adjusted. The proportional valve 31BR operates in response to a control command (current command) output from the controller 30.

Then, the pilot pressure by the hydraulic oil introduced from the pilot pump 15 to the right pilot port of the control valve 175R via the proportional valve 31BR is adjusted. The proportional valve 31BL can adjust the pilot pressure so that the control valve 175L and the control valve 175R can be stopped at any valve position. The proportional valve 31BR can also adjust the pilot pressure so that the control valve 175R can be stopped at any valve position.

With this configuration, the controller 30 can supply the hydraulic oil discharged from the pilot pump 15 to the right pilot port of the control valve 175L and the left pilot port of the control valve 175R via the proportional valve 31BL in response to the boom raising operation by the operator. The controller 30 can also supply the hydraulic oil discharged from the pilot pump 15 to the right pilot port of the control valve 175L and the left pilot port of the control valve 175R via the proportional valve 31BL regardless of the boom raising operation by the operator. That is, the controller 30 can raise the boom 4 in response to the boom raising operation by the operator or regardless of the boom raising operation by the operator.

Furthermore, the controller 30 can supply the hydraulic oil discharged from the pilot pump 15 to the right pilot port of the control valve 175R via the proportional valve 31BR in response to the boom lowering operation by the operator. The controller 30 can also supply the hydraulic oil discharged from the pilot pump 15 to the right pilot port of the control valve 175R via the proportional valve 31BR regardless of the boom lowering operation by the operator. That is, the controller 30 can lower the boom 4 in response to the boom lowering operation by the operator or regardless of the boom lowering operation by the operator.

As illustrated in FIG. 4C, the right operation lever 26R is also used to operate the bucket 6. Specifically, the right operation lever 26R uses the hydraulic oil discharged from the pilot pump 15 to apply the pilot pressure corresponding to the operation in the left-right direction to the pilot port of the control valve 174. More specifically, the right operation lever 26R, if it is operated in the bucket closing direction (left direction), applies the pilot pressure corresponding to the operation amount to the left pilot port of control valve 174. The right operation lever 26R, if it is operated in the bucket opening direction (right direction), applies the pilot pressure corresponding to the operation amount to the right pilot port of the control valve 174.

The operation sensor 29RB detects the content of an operation performed by the operator on the right operation lever 26R in the left-right direction, and outputs the detected value to the controller 30.

The proportional valve 31CL operates in response to a control command (current command) output from the controller 30. Then, the pilot pressure by the hydraulic oil introduced from the pilot pump 15 to the left pilot port of the control valve 174 via the proportional valve 31CL is adjusted. The proportional valve 31CR operates in response to a control command (current command) output from the controller 30. Then, the pilot pressure by the hydraulic oil introduced from the pilot pump 15 to the right pilot port of the control valve 174 via the proportional valve 31CR is adjusted.

The proportional valve 31CL can adjust the pilot pressure so that the control valve 174 can be stopped at any valve position. Similarly, the proportional valve 31CR can adjust the pilot pressure so that the control valve 174 can be stopped at any valve position.

With this configuration, the controller 30 can supply the hydraulic oil discharged from the pilot pump 15 to the left pilot port of the control valve 174 via the proportional valve 31CL in response to the bucket closing operation by the operator. Also, the controller 30 can supply the hydraulic oil discharged from the pilot pump 15 to the left pilot port of the control valve 174 via the proportional valve 31CL regardless of the bucket closing operation by the operator. That is, the controller 30 can close the bucket 6 in response to the bucket closing operation by the operator or regardless of the bucket closing operation by the operator.

Furthermore, the controller 30 can supply the hydraulic oil discharged from the pilot pump 15 to the right pilot port of the control valve 174 via the proportional valve 31CR in response to the bucket opening operation by the operator. The controller 30 can also supply the hydraulic oil discharged from the pilot pump 15 to the right pilot port of the control valve 174 via the proportional valve 31CR regardless of the bucket opening operation by the operator. That is, the controller 30 can open the bucket 6 in response to the bucket opening operation by the operator or regardless of the bucket opening operation by the operator.

As illustrated in FIG. 4D, the left operation lever 26L is also used to operate the swing mechanism 2. Specifically, the left operation lever 26L uses the hydraulic oil discharged from the pilot pump 15 to apply the pilot pressure corresponding to the operation in the left-right direction to the pilot port of the control valve 173. More specifically, the left operation lever 26L, if it is operated in the left swing direction (left direction), applies the pilot pressure corresponding to the operation amount to the left pilot port of control valve 173. Also, the left operation lever 26L, if it is operated in the right swing direction (right direction), applies the pilot pressure corresponding to the operation amount to the right pilot port of the control valve 173.

The operation sensor 29LB detects the content of an operation performed by the operator on the left operation lever 26L in the left-right direction, and outputs the detected value to the controller 30.

The proportional valve 31DL operates in response to a control command (current command) output from the controller 30. Then, the pilot pressure by the hydraulic oil introduced from the pilot pump 15 to the left pilot port of the control valve 173 via the proportional valve 31DL is adjusted.

The proportional valve 31DR operates in response to a control command (current command) output from the controller 30. Then, the pilot pressure by the hydraulic oil introduced from the pilot pump 15 to the right pilot port of the control valve 173 via the proportional valve 31DR is adjusted. The proportional valve 31DL can adjust the pilot pressure so that the control valve 173 can be stopped at any valve position. Similarly, the proportional valve 31DR can adjust the pilot pressure so that the control valve 173 can be stopped at any valve position.

With this configuration, the controller 30 can supply the hydraulic oil discharged from the pilot pump 15 to the left pilot port of the control valve 173 via the proportional valve 31DL in response to the left swing operation by the operator. The controller 30 can also supply the hydraulic oil discharged from the pilot pump 15 to the left pilot port of the control valve 173 via the proportional valve 31DL regardless of the left swing operation by the operator. That is, the controller 30 can swing the swing mechanism 2 to the left in response to the left swing operation by the operator or regardless of the left swing operation by the operator.

Furthermore, the controller 30 can supply the hydraulic oil discharged from the pilot pump 15 to the right pilot port of the control valve 173 via the proportional valve 31DR in response to the right swing operation by the operator. The controller 30 can also supply the hydraulic oil discharged from the pilot pump 15 to the right pilot port of the control valve 173 via the proportional valve 31DR regardless of the right swing operation by the operator. That is, the controller 30 can swing the swing mechanism 2 to the right in response to the right swing operation by the operator or regardless of the right swing operation by the operator.

The shovel 100 may have a configuration for automatically moving the lower traveling body 1 forward and backward. In such a case, the hydraulic system part related to operations of a left traveling hydraulic motor 2ML and the hydraulic system part related to operations of a right traveling hydraulic motor 2MR may be configured in the same manner as the hydraulic system part related to operations of the boom cylinder 7 and the like.

The shovel 100 may also include a configuration for automatically operating the bucket tilt mechanism. In such a case, the hydraulic system part related to the bucket tilt cylinder constituting the bucket tilt mechanism may be configured in the same manner as the hydraulic system part related to operations of the boom cylinder 7 or the like.

Although the electric operation lever has been described as the form of the operation device 26, a hydraulic operation lever may be employed instead of the electric operation lever. In such a case, the lever operation amount of the hydraulic operation lever may be detected in the form of pressure by a pressure sensor and input to the controller 30. Furthermore, a solenoid valve may be disposed between the operation device 26 as the hydraulic operation lever and the pilot port of each control valve.

The solenoid valve is configured to operate in accordance with an electrical signal from the controller 30. With this configuration, in a case where a manual operation using the operation device 26 as the hydraulic operation lever is performed, the operation device 26 can move each control valve by increasing or decreasing the pilot pressure according to the lever operation amount. Each control valve may be constituted by a solenoid spool valve. In such a case, the solenoid spool valve operates in accordance with an electric signal from the controller 30 corresponding to the lever operation amount of the electric operation lever.

Figure 5:
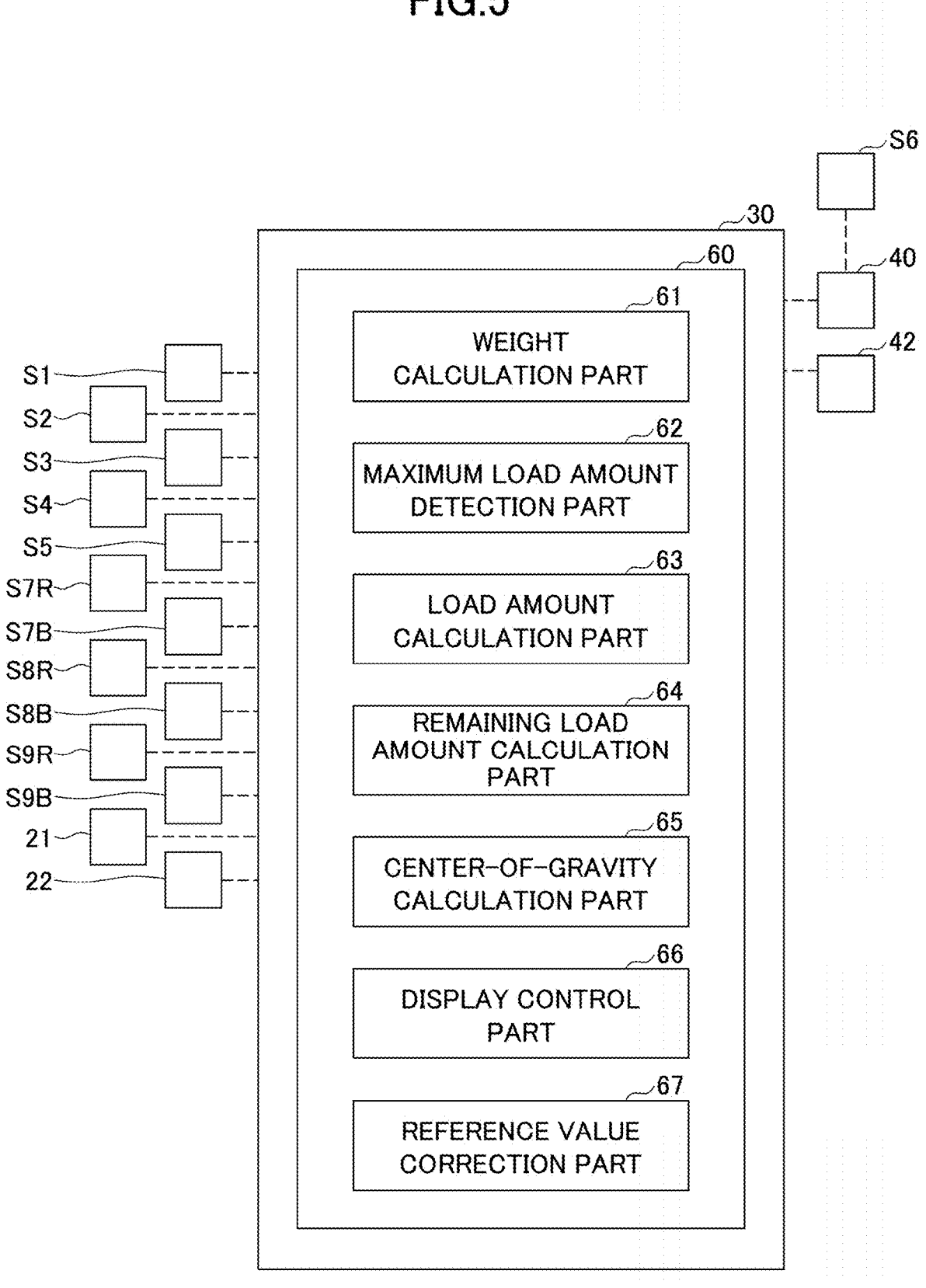
FIG. 5 is a diagram for schematically illustrating an example of components related to an earth and sand weight detection function of the shovel according to the embodiment.

Next, with reference to FIG. 5, details of a configuration related to an earth and sand weight detection function of the shovel 100 according to this embodiment will be described. FIG. 5 is a diagram for schematically illustrating an example of components related to the earth and sand weight detection function in the shovel 100 according to this embodiment.

As described above with reference to FIG. 3, the controller 30 includes the earth and sand weight processing part 60 as a functional part related to the detection function of the weight of the earth and sand excavated by the bucket 6.

The earth and sand weight processing part 60 includes a weight calculation part 61, a maximum load amount detection part 62, a load amount calculation part 63, a remaining load amount calculation part 64, a center-of-gravity calculation part 65, a display control part 66, and a reference value correction part 67.

Here, an example of operations of loading earth and sand (load) into a dump truck by the shovel 100 according to this embodiment will be described.

First, the shovel 100 controls the attachment to excavate earth and sand by the bucket 6 at the excavation position (excavation operation). The shovel 100 then causes the upper swing body 3 to swing to move the bucket 6 from the excavation position to the dumping position (swing operation).

A cargo bed of the dump truck is disposed under the dumping position. At the dumping position, the shovel 100 controls the attachment to dump the earth and sand in the bucket 6, thereby loading the earth and sand in the bucket 6 onto the cargo bed of the dump truck (earth and sand dumping operation).

Next, the shovel 100 causes the upper swing body 3 to swing to move the bucket 6 from the dumping position to the excavation position (swing operation). By repeating these operations, the shovel 100 loads the excavated earth and sand onto the cargo bed of the dump truck.

The weight calculation part 61 calculates the weight of the earth and sand (load) in the bucket 6 based on the thrust of the boom cylinder 7.

For example, the weight calculation part 61 calculates the earth and sand weight based on the thrust of the boom cylinder 7, the distance from the pin connecting the upper swing body 3 and the boom 4 to the center of the gravity of the earth and sand, and the equation of the moment around the pin connecting the upper swing body 3 and the boom 4.

The weight calculation part 61 then calculates the weight of the load in bucket 6 by subtracting the weight of the entire bucket 6 when it is determined that the bucket 6 is in an empty state from the calculated weight of the entire bucket 6.

In the following description, the weight of the bucket 6 when it is determined that the bucket 6 is in the empty state may be referred to as a reference value which is used for subtraction in the calculation of the load amount by the weight calculation part 61. The reference value includes both an initial value indicating the weight of the bucket 6 stored in the controller 30 at the time of factory shipment or the like of the shovel 100 and a past reference value set in a past loading operation. Details of the reference value will be described later.

Although, in this embodiment, the earth and sand (load) is described as being loaded on the bucket 6, the load is, in other words, what is conveyed by the end attachment of the shovel 100. Therefore, the earth and sand can be said to be a load object conveyed by the end attachment of the shovel 100.

In this embodiment, the timing at which it is determined that the bucket 6 is in the empty state is notified to the operator of the shovel 100 as the timing at which the reference value is corrected. Therefore, in this embodiment, the operator does not need to confirm whether or not the bucket 6 is empty. In this embodiment, the operator can accurately know the timing for correcting the reference value.

The maximum load amount detection part 62 detects the maximum load amount of the dump truck on which earth and sand are to be loaded. For example, the maximum load amount detection part 62 specifies a dump truck on which earth and sand are to be loaded based on images captured by the imaging device S6. "Based on the image captured by the imaging device S6" means, for example, using information obtained by performing one or more image processes on the image captured by the imaging device S6. The maximum load amount of the dump truck may be manually input by the operator.

Next, the maximum load amount detection part 62 detects the maximum load amount of the dump truck based on the specified image of the dump truck. For example, the maximum load amount detection part 62 determines the vehicle type (size or the like) of the dump truck based on the specified image of the dump truck.

Specifically, for example, the maximum load amount detection part 62 may have a table in which the vehicle type and the maximum load amount are associated with each other, and, based on both the vehicle type determined from the image and the table, the maximum load amount detection part obtains the maximum load amount of the dump truck. Note that the maximum load amount of the dump truck, the vehicle type, and the like may be input by the input device 42, and the maximum load amount detection part 62 may obtain the maximum load amount of the dump truck based on the input information of the input device 42.

The load amount calculation part 63 calculates the weight of the earth and sand loaded on the dump truck. That is, every time the earth and sand in the bucket 6 is dumped onto the cargo bed of the dump truck, the load amount calculation part 63 adds the weight of the earth and sand in the bucket 6 calculated by the weight calculation part 61 to calculate the loaded amount (total weight) which is the total weight of the earth and sand loaded onto the cargo bed of the dump truck. When the dump truck to be loaded with earth and sand is changed to new dump truck, the load amount is reset.

The remaining load amount calculation part 64 calculates the difference between the maximum load amount of the dump truck detected by the maximum load amount detection part 62 and the current loaded amount calculated by the load amount calculation part 63 as the remaining load amount. The remaining load amount is the remaining weight of the earth and sand that can be loaded on the dump truck.

The center-of-gravity calculation part 65 calculates the center of gravity of the earth and sand (load) in the bucket 6. Note that a method of calculating the center of gravity of the earth and sand will be described below.

The display control part 66 displays, on the main screen (for example, another screen) displayed on the display device 40, an icon image for guiding transition to the loading work screen (for example, a screen). Details of the main screen and the loading work screen will be described later.

Upon reception of selection of the input device 42 corresponding to the icon image in the display device 40, the display control part 66 transitions the main screen to the screen for the loading work. On the loading work screen of this embodiment, an icon image corresponding to the input device 42 for correcting (updating) the reference value in the calculation of the weight of the load by the weight calculation part 61 is displayed. In the following description, this icon image may be referred to as a correction icon image.

The display control part 66 may cause the display device 40 to display the weight of the earth and sand in the bucket 6 calculated by the weight calculation part 61, the maximum load amount of the dump truck detected by the maximum load amount detection part 62, the loaded amount on the dump truck (the total weight of the earth and sand loaded onto the cargo bed) calculated by the load amount calculation part 63, and the remaining load amount of the dump truck (the remaining weight of the earth and sand that can be loaded thereon) calculated by the remaining load amount calculation part 64.

In a case where the load amount exceeds the maximum load amount, the display control part 66 may cause the display device 40 to display a warning. Furthermore, in a case where the calculated weight of the earth and sand in the bucket 6 exceeds the remaining load amount, the display control part 66 may cause the display device 40 to display a warning. Note that the warning is not limited to the case of being displayed on the display device 40, and may be a sound output by the sound output device 43. Thus, earth and sand can be prevented from being loaded in excess of the maximum load amount of the dump truck.

At the timing when it is determined that the bucket 6 is in the empty state, the display control part 66 also changes the display mode of the correction icon image displayed on the loading work screen. In this embodiment, the operator is notified of the timing at which the reference value is corrected by changing the display mode of the correction icon image.

The reference value correction part 67 corrects the reference value used when the weight calculation part 61 calculates the weight of the load. The reference value correction part 67 compares the weight of the bucket 6 calculated by the weight calculation part 61 with the currently set reference value, and in a case where a difference between the weight of the bucket 6 and the currently set reference value is larger than a predetermined threshold value, determines that the bucket 6 is in a state after excavation in which earth and sand and the like are loaded. In such a case, the reference value correction part 67 prohibits the weight calculation part 61 from correcting the reference value.

Specifically, the reference value correction part 67 causes the display control part 66 to display the correction icon image on the loading work screen in a display mode indicating that the selection of the corresponding input device 42 is invalid, and prohibits the selection of the input device 42 corresponding to the correction icon image. Details of the display mode of the correction icon image will be described later.

In a case where the difference between the weight of the bucket 6 and the currently set reference value is less than or equal to the predetermined threshold value, the reference value correction part 67 determines that the bucket 6 is in the empty state after dumping, and allows the correction of the reference value.

Specifically, the reference value correction part 67 causes the display control part 66 to display the correction icon image on the loading work screen in a display mode indicating that the corresponding input device 42 is selectable, and allows the input device 42 corresponding to the correction icon image to be selected.

When the input device 42 corresponding to the correction icon image is selected, the reference value correction part 67 sets the weight of the bucket 6 at this time as a new reference value. In other words, the reference value correction part 67 updates the initial value stored in the controller 30 at the time of factory shipment or the reference value set in the past loading operation.

Figure 6:
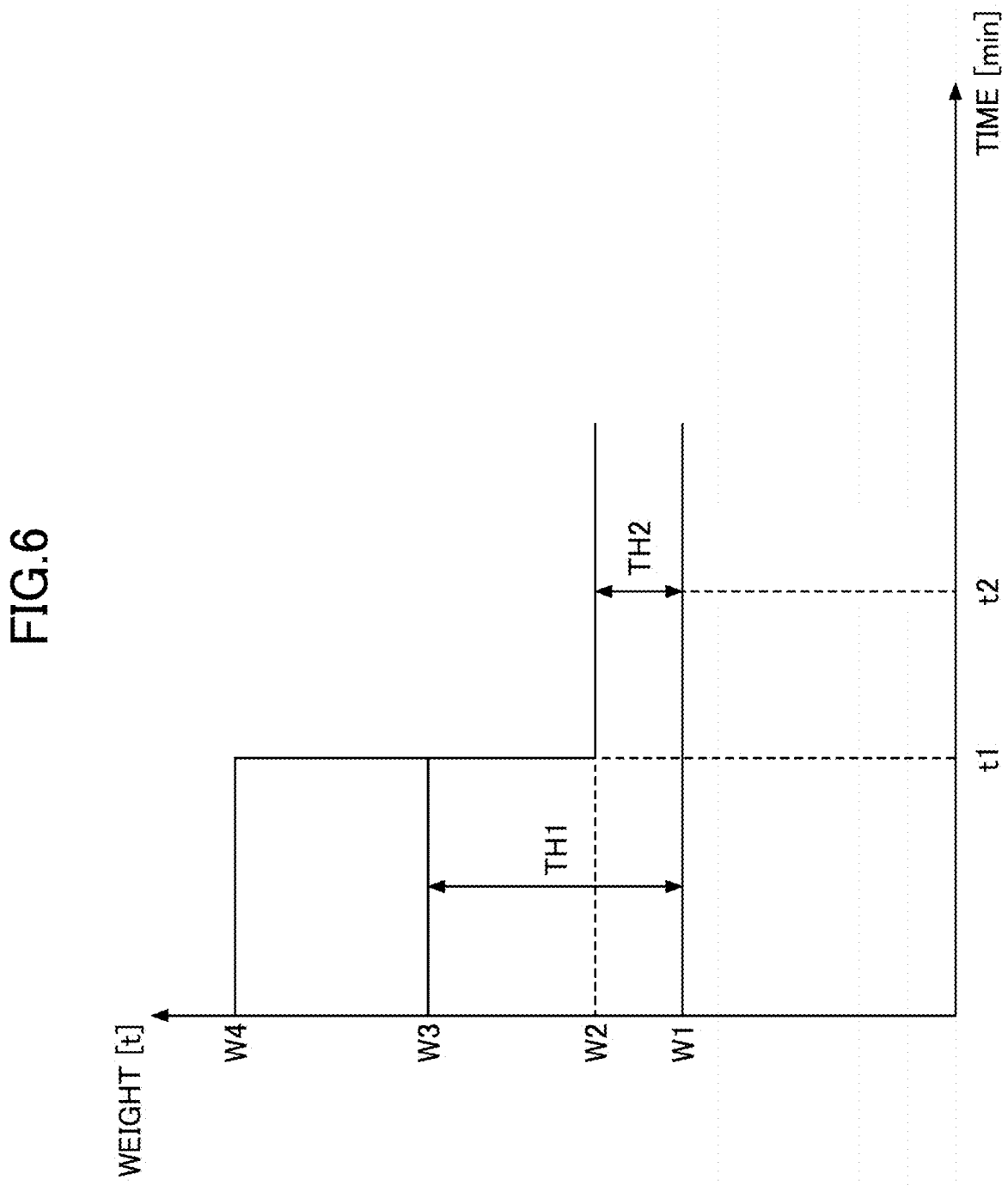
FIG. 6 is a diagram for explaining a reference value.

Hereinafter, the reference value of this embodiment will be described with reference to FIG. 6. FIG. 6 is a diagram for explaining the reference value. In FIG. 6, the vertical axis represents weight, and the horizontal axis represents time.

In the example of FIG. 6, a change in the weight of the bucket 6 during the loading operation of the shovel 100 is illustrated. FIG. 6 illustrates a case where the bucket 6 after excavation dumps the earth and sand loaded in the bucket 6 at a timing t1. At this time, the initial value has been set in the shovel 100 as the reference value to be subtracted from the weight of the bucket 6.

In FIG. 6, a weight W1 is set as the initial value, and a difference between a weight W3 and a weight W1 is set as a predetermined threshold value TH1 for determining whether or not the bucket 6 is empty.

In FIG. 6, in the state before the timing t1, the weight of the bucket 6 is a weight W4, and a difference between the weight W4 and the weight W1 is larger than the predetermined threshold value TH1. Therefore, the reference value correction part 67 determines that the bucket 6 is in the state in which the earth and sand are loaded, and prohibits the correction of the reference value.

At a timing t2 after the timing t1, it is a state after the earth and sand are dumped from the bucket 6. In such a case, a difference TH2 between the weight W2 and the weight W1 of the bucket 6 is less than or equal to the predetermined threshold value TH1.

In such a case, the reference value correction part 67 determines that the bucket 6 is in the empty state, and allows the correction of the reference value. Specifically, the reference value correction part 67 sets the weight W2 of the bucket 6 at the time when it is determined that the bucket 6 is in the empty state as the reference value to be referred to in the subsequent processing of the weight calculation part 61.

In other words, the reference value correction part 67 sets a value obtained by adding the difference TH2 between the weight W2 and the weight W1 of the bucket 6 to the weight W1 which is the reference value after the previous dumping as the reference value to be referred to in the subsequent processing.

The difference TH2 between the weight W2 and the weight W1 of the bucket 6 is, for example, the weight of the earth and sand that sticks to the inside of the bucket 6 and is not dumped when dumping the earth and sand. In the loading operation, for example, depending on the type of the earth and sand, and the temperature of the hydraulic oil of the shovel 100, or the like, the earth and sand may adhere to the tip or the like of the bucket 6, and a small amount of earth and sand may remain in the bucket 6.

In such a case, when the weight of the load on the bucket 6 is calculated using the initial value at the time of factory shipment as the reference value, the weight of the earth and sand remaining in the bucket 6 and not dumped onto the cargo bed of the dump truck is also included in the weight of the load dumped onto the cargo bed of the dump truck. Although the initial value is used as the set reference value in the above embodiment, the reference value set in the past loading operation may be used as the reference value for calculating the difference.

In this embodiment, the weight of the load excluding the weight of the earth and sand remaining in the bucket 6 and not dumped can be calculated by performing the correction using the weight of the bucket 6 after dumping the load from the bucket 6 as the reference value.

In this embodiment, as described above, when the weight of the load in the bucket 6 is calculated, the reference value to be subtracted from the weight of the entire bucket 6 is corrected, so that the accuracy of the calculation of the weight of the load in the bucket 6 can be improved. In the above-described embodiment, when the difference between the calculated weight and the reference value is less than or equal to the predetermined threshold value TH1, the controller 30 determines that it is time to correct the reference value; however, the determination method is not limited thereto.

For example, when the weight calculated by the weight calculation part 61 is less than or equal to a predetermined value, the controller 30 may determine that it is the timing for correcting the reference value (the bucket 6 is in the empty state). The controller 30 may also determine the timing for correcting the reference value (the bucket 6 is in the empty state) based on the output of the space recognition device.

Figure 7:
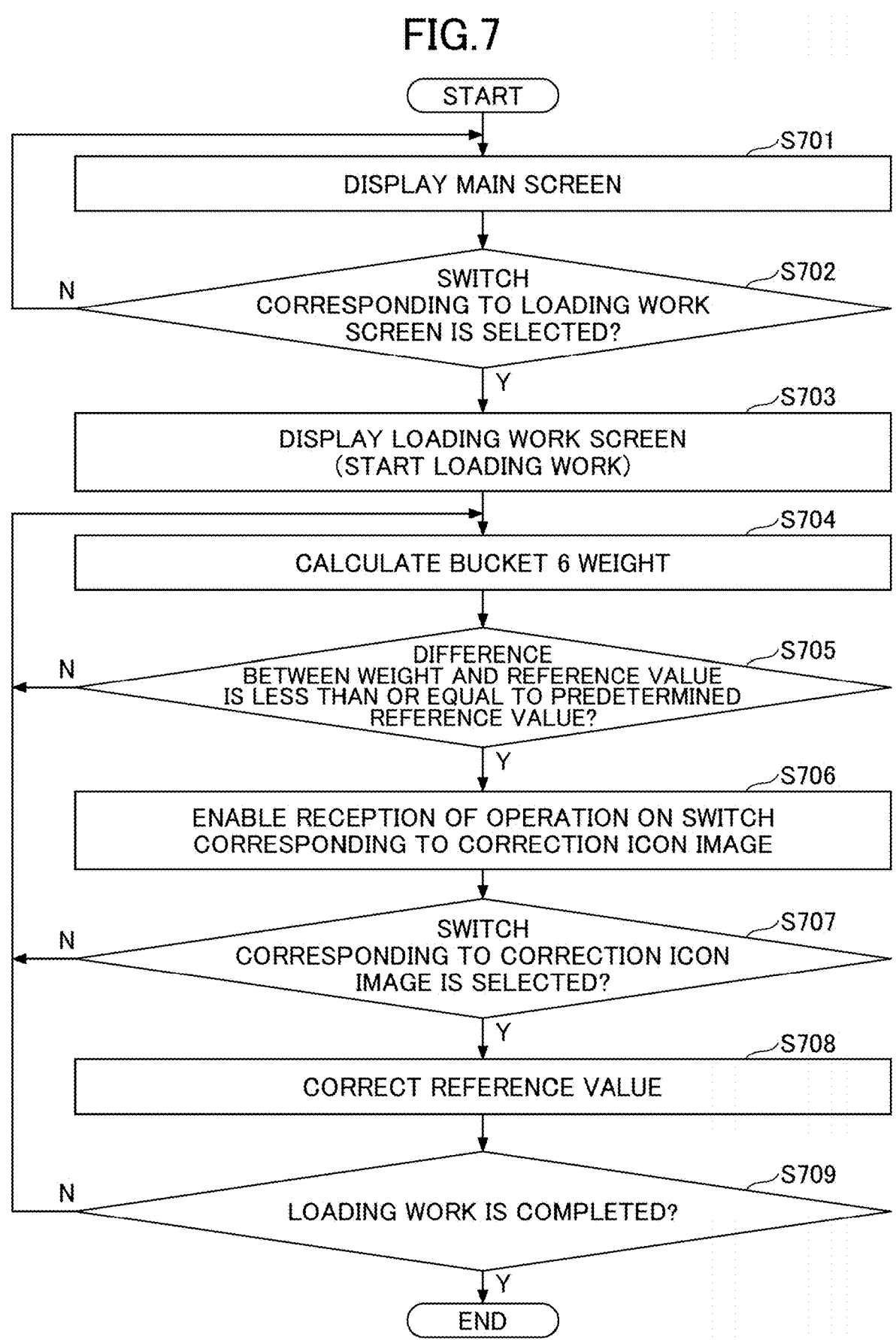
FIG. 7 is a flowchart for explaining processing performed by a display control part.

Next, the operation of the earth and sand weight processing part 60 of this embodiment will be described with reference to FIG. 7. FIG. 7 is a flowchart for explaining the operation of the earth and sand weight processing part.

In the earth and sand weight processing part 60 of this embodiment, the display control part 66 displays the main screen on the display device 40 (Step S701). The display control part 66 may, for example, display the main screen on the display device 40 when the engine 11 of the shovel 100 is activated.

Subsequently, the display control part 66 determines whether or not the input device 42 (switch) corresponding to the loading work screen is selected (Step S702). Specifically, the display control part 66 determines whether or not the input device 42 corresponding to the icon image for guiding the transition to the loading work screen is operated.

In Step S702, in a case where the corresponding input device 42 is not selected, the display control part 66 returns to Step S701.

In Step S702, when the corresponding input device 42 is selected, the display control part 66 transitions the main screen to the loading work screen. In other words, the display control part 66 displays, on the display device 40, the loading work screen (Step S703). On the loading work screen displayed here, the correction icon image corresponding to the input device 42 for updating the reference value is displayed.

Subsequently, the earth and sand weight processing part 60 causes the weight calculation part 61 to calculate the weight in the bucket 6 (Step S704). The earth and sand weight processing part 60 then causes the reference value correction part 67 to determine whether or not the difference between the weight of the load calculated in Step S704 and the reference value is less than or equal to the predetermined threshold value TH1 (Step S705).

In Step S705, in a case where the difference is not less than or equal to the predetermined value, that is, it is the state in which the earth and sand and the like are loaded on the bucket 6, the earth and sand weight processing part 60 returns to Step S704.

In Step S705, when the difference is less than or equal to the predetermined value, that is, it is the state in which the bucket 6 is in the empty state after dumping the earth and sand, the reference value correction part 67 enables reception of an operation on the input device 42 (switch) corresponding to the correction icon image (Step S706).

Specifically, the reference value correction part 67 causes the display control part 66 to change the display mode of the correction icon image, and allows the input device 42 corresponding to the correction icon image to be selected.

The earth and sand weight processing part 60 then determines whether or not the input device 42 (switch) corresponding to the correction icon image is selected (Step S707). In a case where the corresponding input device 42 is not selected in Step S707, the earth and sand weight processing part 60 returns to Step S704.

When the corresponding input device 42 is selected in Step S707, the reference value correction part 67 performs the correction to set the weight of the bucket 6 calculated by the weight calculation part 61 in Step S704 as the reference value (Step S708). Therefore, it can be said that the correction icon image of this embodiment is an icon image corresponding to an instruction to correct the reference value used in the calculation of the load weight loaded in the bucket 6.

Subsequently, the earth and sand weight processing part 60 determines whether or not the loading work is completed (Step S709). Specifically, the earth and sand weight processing part 60 may determine that the loading work is completed when transition from the loading work screen to the main screen occurs.

In Step S709, in a case where the loading work has not been completed, the earth and sand weight processing part 60 returns to Step S704. In Step S709, in a case where the loading work has been completed, the earth and sand weight processing part 60 finishes the processing by the reference value correction part 67.

Figure 8:
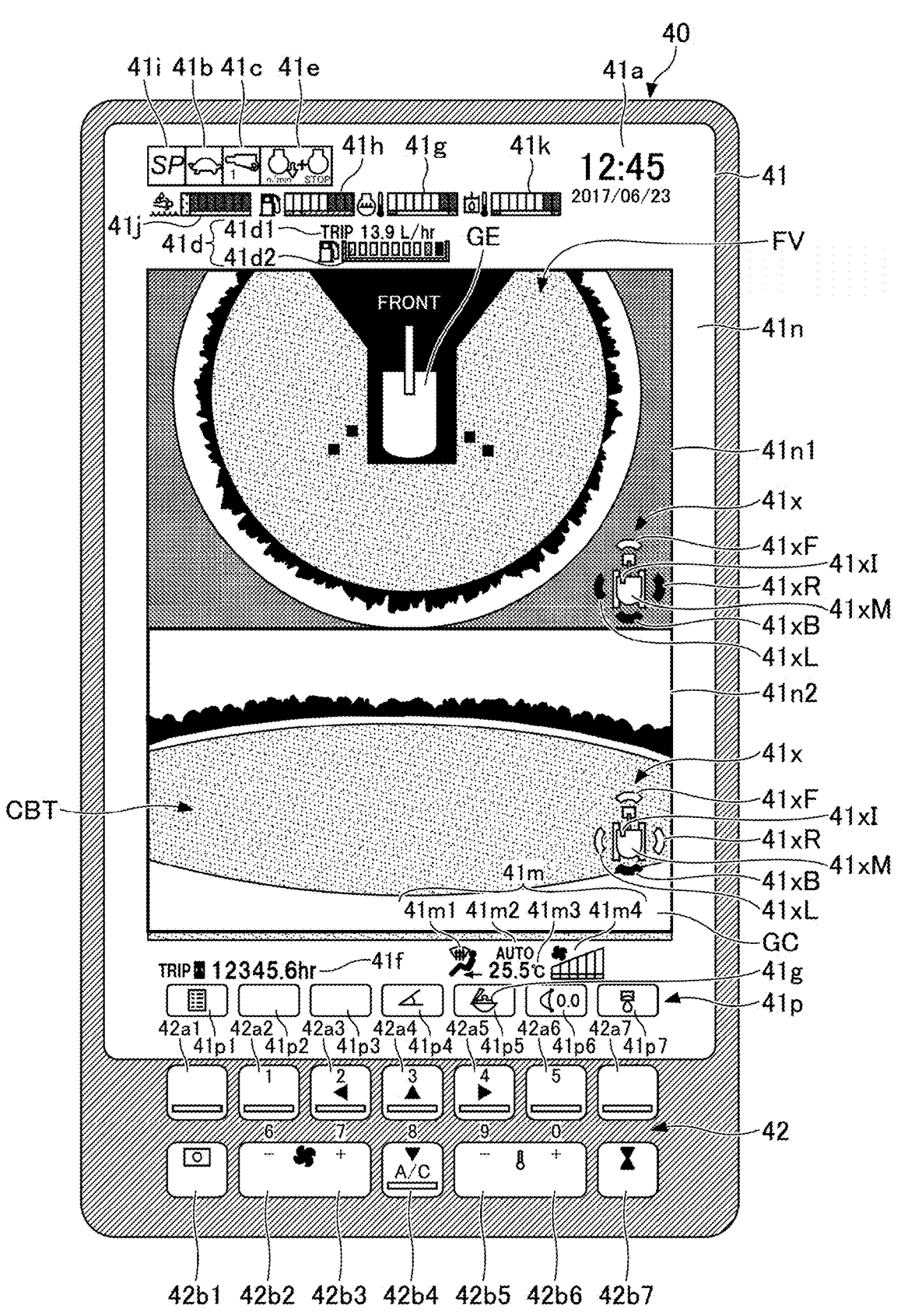
FIG. 8 is a diagram for illustrating an example of a main screen.

Next, a display example of the display device 40 of this embodiment will be described. FIG. 8 is a diagram for illustrating an example of the main screen.

A display device 40 illustrated in FIG. 8 includes an image display part 41 and an input device 42. The image display part 41 is a screen on which various images are displayed, and in FIG. 8, a main screen is displayed on the image display part 41. The input device 42 includes various types of menu switches.

First, the image display part 41 will be described. As illustrated in FIG. 8, the image display part 41 includes a date and time display area 41*a*, a travel mode display area 41*b*, an attachment display area 41*c*, a fuel efficiency display area 41*d*, an engine control state display area 41*e*, an engine operating time display area 41*f*, a cooling water temperature display area 41*g*, a remaining fuel amount display area 41*h*, a rotation speed mode display area 41*i*, a remaining urea-water amount display area 41*j*, a hydraulic oil temperature display area 41*k*, an air conditioner operation state display area 41*m*, an image display area 41*n*, and a menu display area 41*p*.

The travel mode display area 41*b*, the attachment display area 41*c*, the engine control state display area 41*e*, the rotation speed mode display area 41*i*, and the air conditioner operation state display area 41*m* are areas for displaying setting state information that is information related to the setting state of the shovel 100. The fuel efficiency display area 41*d*, the engine operating time display area 41*f*, the cooling water temperature display area 41*g*, the remaining fuel amount display area 41*h*, the remaining urea-water amount display area 41*j*, and the hydraulic oil temperature display area 41*k* are areas for displaying operation state information that is information related to the operation state of the shovel 100.

Specifically, the date and time display area 41*a* is an area for displaying the current date and time. The travel mode display area 41*b* is an area for displaying the current travel mode. The attachment display area 41*c* is an area for displaying an image representing the currently mounted attachment. The fuel efficiency display area 41*d* is an area for displaying fuel efficiency information calculated by the controller 30. The fuel efficiency display area 41*d* includes an average fuel efficiency display area 41*d*1 for displaying lifelong average fuel efficiency or section average fuel efficiency, and an instantaneous fuel efficiency display area 41*d*2 for displaying instantaneous fuel efficiency.

The engine control state display area 41*e* is an area for displaying the control state of the engine 11. The engine operating time display area 41*f* is an area for displaying the cumulative operating time of the engine 11. The cooling water temperature display area 41*g* is an area for displaying the current temperature state of the engine cooling water. The remaining fuel amount display area 41*h* is an area for displaying a remaining amount state of the fuel stored in the fuel tank.

The rotation speed mode display area 41*i* is an area for displaying, as an image, the current rotation speed mode set by an engine rotation speed adjustment dial 75. The remaining urea-water amount display area 41*j* is an area for displaying, as an image, the state of the remaining amount of urea-water stored in the urea-water tank. The hydraulic oil temperature display area 41*k* is an area for displaying the temperature state of the hydraulic oil in the hydraulic oil tank.

The air conditioner operation state display area 41*m* includes an air outlet display area 41*m*1 for displaying the current position of the air outlet, an operation mode display area 41*m*2 for displaying the current operation mode, a temperature display area 41*m*3 for displaying the current set temperature, and an air volume display area 41*m*4 for displaying the current set air volume.

The image display area 41*n* is an area where an image captured by the imaging device S6 is displayed. In the example of FIG. 8, the image display area 41*n* displays a bird's-eye view image FV and a rear image CBT. The bird's-eye view image FV is, for example, a virtual viewpoint image generated by the display control part 66, and is generated based on images captured by the rear camera S6B, the left camera S6L, and the right camera S6R.

Furthermore, a shovel graphic GE corresponding to the shovel 100 is arranged in the central portion of the bird's-eye view image FV. This is to allow the operator to intuitively ascertain the positional relationship between the shovel 100 and an object existing around the shovel 100. The rear image CBT is an image illustrating the space behind the shovel 100 and includes an image GC of the counterweight. The rear image CBT is a real viewpoint image generated by a controller 40*a* based on an image captured by the rear camera S6B.

The image display area 41*n* includes a first image display area 41*n*1 located in the upper area and a second image display area 41*n*2 located in the lower area therewithin. In the example of FIG. 8, the bird's-eye view image FV is arranged in the first image display area 41*n*1, and the rear image CBT is arranged in the second image display area 41*n*2. In the image display area 41*n*, however, the bird's-eye view image FV may be arranged in the second image display area 41*n*2, and the rear image CBT may be arranged in the first image display area 41*n*1.

Furthermore, in the example of FIG. 8, the bird's-eye view image FV and the rear image CBT are arranged adjacent to each other in the up-down direction, but may be arranged to be spaced apart from each other. In the example of FIG. 8, the image display area 41*n* is a vertically long area, but the image display area 41*n* may be a laterally long area.

When the image display area 41*n* is a horizontally long area, in the image display area 41*n*, the bird's-eye view image FV may be arranged on the left side area as being the first image display area 41*n*1, and the rear image CBT may be arranged on the right side area as being the second image display area 41*n*2. In such a case, the bird's-eye view image FV and the rear image CBT may be arranged to be spaced apart from each other in the right-left direction, or the positions of the bird's-eye view image FV and the rear image CBT may be switched.

Furthermore, in this embodiment, an icon image 41*x* is displayed in each of the first image display area 41*n*1 and the second image display area 41*n*2. The icon image 41*x* is an image representing a relative relationship between the position of the imaging device S6 and the direction of the attachment of the upper swing body 3.

The icon image 41*x* according to this embodiment includes an image 41*x*M of the shovel 100, an image 41*x*F indicating the front side of the shovel 100, and an image 41*x*B indicating the rear side of the shovel 100. The icon image 41*x* also includes an image 41*x*L indicating the left side of the shovel 100, an image 41*x*R indicating the right side of the shovel 100, and an image 41*x*1 indicating the inside of the cabin 10.

The images 41*x*F, 41*x*B, 41*x*L, 41*x*R, and 41*x*1 correspond to the images captured by the camera S6F that captures images of the front side of the shovel 100, the camera S6B that captures images of the rear side of the shovel 100, the camera S6L that captures images of the left side of the shovel 100, the camera S6R that captures images of the right side of the shovel 100, a camera in the cabin respectively.

In this embodiment, when an image corresponding to each camera is selected in the icon image 41*x*, the image data captured by the camera corresponding to the selected image is displayed in the image display area 41*n*.

In the example of FIG. 8, in the first image display area 41*n*1, the display mode for the images 41*x*B, 41*x*L, and 41*x*R is different from the display mode for the images 41*x*F and 41*x*I. Therefore, it can be seen that the bird's-eye view image represented by the image data synthesized from the image data captured by the cameras S6B, S6L, and S6R corresponding to the images 41*x*B, 41*x*L, and 41*x*R, respectively, is displayed in the first image display area 41*n*1.

In the second image display area 41*n*2, the display mode for the image 41*x*B is different from the display mode for the images 41*x*F, 41*x*L, 41*x*R, and 41*x*I. Therefore, it can be seen that the image represented by the image data captured by the camera S6B corresponding to the image 41*x*B is displayed in the second image display area 41*n*2.

The menu display area 41*p* includes tabs 41*p*1 to 41*p*7. In the example of FIG. 8, the tabs 41*p*1 to 41*p*7 are arranged at the lowermost portion of the image display part 41 so as to be spaced apart from each other in the left-right direction. Icon images for displaying various kinds of information are displayed in the tabs 41*p*1 to 41*p*7.

In the tab 41*p*1, a menu detail item icon image for displaying menu detail items is displayed. When the tab 41*p*1 is selected by the operator, the icon images displayed in the tabs 41*p*2 to 41*p*7 are switched to icon images related to the menu detailed items.

In the tab 41*p*4, an icon image for displaying information related to the digital level is displayed. When the tab 41*p*4 is selected by the operator, the rear image CBT is switched to a screen indicating information related to the digital level. However, a screen indicating information related to the digital level may be displayed by being superimposed on the rear image CBT or by reducing the size of the rear image CBT.

Furthermore, the bird's-eye view image FV may be switched to the screen indicating information related to the digital level, or the screen indicating information related to the digital level may be displayed by being superimposed on the bird's-eye view image FV or by reducing the size of the bird's-eye view image FV.

In the tab 41*p*5, an icon image for transitioning the main screen displayed on the image display part 41 to the loading work screen is displayed. When the operator selects the described-below input device 42 corresponding to the tab 41*p*5, the main screen displayed on the image display part 41 transitions to a loading work screen. At this time, the image display area 41*n* is continuously displayed, and the menu display area 41*p* is switched to an area for displaying information related to the loading work.

In the tab 41*p*6, an icon image for displaying information related to computerized construction is displayed. When the tab 41*p*6 is selected by the operator, the rear image CBT is switched to a screen illustrating information related to the computerized construction. However, the screen indicating the information related to the computerized construction may be displayed by being superimposed on the rear image CBT or by reducing the size of the rear image CBT. Furthermore, the bird's-eye view image FV may be switched to the screen indicating information related to the computerized construction, or the screen indicating information related to the digital level by being superimposed on the bird's-eye view image FV or by reducing the size of the bird's-eye view image FV.

In the tab 41*p*7, an icon image for displaying information related to the crane mode is displayed. When the tab 41*p*7 is selected by the operator, the rear image CBT is switched to a screen illustrating information on the crane mode. However, the screen indicating information related to the crane mode may be displayed by being superimposed on the rear image CBT or by reducing the size of the rear image CBT. Furthermore, the bird's-eye view image FV may be switched to the screen indicating information related to the crane mode, or the screen indicating information related to the crane mode may be displayed by being superimposed on the bird's-eye view image FV or by reducing the size of the bird's-eye view image FV.

No icon image is displayed on the tabs 41*p*2 and 41*p*3. Therefore, even when the operator operates the tabs 41*p*2 and 41*p*3, no change occurs in the image displayed on the image display part 41.

The icon images displayed on the tabs 41$p$1 to 41$p$7 are not limited to the above-described examples, and icon images for displaying other information may be displayed.

Next, the input device 42 will be described. As illustrated in FIG. 8, the input device 42 is configured by one or more of button-type switches on which selection, setting input, and the like of the tabs 41$p$1 to 41$p$7 are performed by the operator.

In the example of FIG. 8, the input device 42 includes seven switches 42$a$1 to 42$a$7 arranged in the upper area and seven switches 42$b$1 to 42$b$7 arranged in the lower area, within the area for the input device. The switches 42$b$1 to 42$b$7 are arranged below the switches 42$a$1 to 42$a$7, respectively.

The number, form, and arrangement of the switches of the input device 42 are, however, not limited to the above-described example. For example, the functions of the button-type switches may be integrated into one by a jog wheel, a jog switch, or the like, or the input device 42 may be separated from the display device 40. Alternatively, the tabs 41$p$1 to 41$p$7 may be arranged on a touch panel in which the image display part 41 and the input device 42 are integrated, and directly operated.

The switches 42$a$1 to 42$a$7 are arranged below the tabs 41$p$1 to 41$p$7 so as to correspond to the tabs 41$p$1 to 41$p$7, respectively, and function as switches that select the tabs 41$p$1 to 41$p$7, respectively.

Since the switches 42$a$1 to 42$a$7 are arranged below the tabs 41$p$1 to 41$p$7 so as to correspond to the tabs 41$p$1 to 41$p$7, the operator can intuitively select the tabs 41$p$1 to 41$p$7.

In FIG. 8, for example, when the switch 42$a$1 is operated, the tab 41$p$1 is selected, the menu display area 41$p$ is changed from the one-row display to the two-row display, and the icon images corresponding to the first menu are displayed in the tabs 41$p$2 to 41$p$7. Furthermore, the size of the rear image CBT is reduced in response to the change of the menu display area 41$p$ from the one-row display to the two-row display. At this time, since the size of the bird's-eye view image FV is maintained without being changed, the visibility when the operator checks the surroundings of the shovel 100 does not deteriorate.

When the switch 42$a$5 is operated, the display control part 66 determines that the tab 41$p$5 is selected, and transition from the main screen to the loading work screen illustrated in FIG. 8 occurs.

Specifically, when the switch 42$a$5 is operated, the display control part 66, while maintaining the image display area 41$n$, sets the menu display area 41$p$ as a work information display area for displaying information related to the loading work.

As described above, in this embodiment, since the captured image is continuously displayed in the image display area 41$n$ also on the loading work screen, the visibility when the operator checks the periphery of the shovel 100 is not deteriorated.

The switch 42$b$1 is a switch for switching the captured image displayed in the image display area 41$n$. Each time the switch 42$b$1 is operated, the captured image displayed in the first image display area 41$n$1 of the image display area 41$n$ is switched among, for example, the rear image, the left image, the right image, and the bird's-eye view image.

Each time the switch 42$b$1 is operated, the captured image displayed in the second image display area 41$n$2 of the image display area 41$n$ may be switched among, for example, the rear image, the left image, the right image, and the bird's-eye view image.

The display control part 66 may change the display mode for the images 41$x$F, 41$x$B, 41$x$L, 41$x$R, and 41$x$1 in the icon image 41$x$ according to the operation of the switch 42$b$1.

Furthermore, each time the switch 42$b$1 is operated, in the image display area 41$n$, the captured image displayed in the first image display area 41$n$1 and the captured image displayed in the second image display area 41$n$2 may be switched.

As described above, the switch 42$b$1 as the input device 42 may switch either one of the screens displayed in the first image display area 41$n$1 and the second image display area 41$n$2, or may switch both the screen displayed in the first image display area 41$n$1 and the second image display area 41$n$2. Furthermore, a switch for switching the screen displayed in the second image display area 41$n$2 may be separately provided.

The switches 42$b$2 and 42$b$3 are switches for adjusting the air volume of the air conditioner. In the example illustrated in FIG. 8, when the switch 42$b$2 is operated, the air volume of the air conditioner decreases, and when the switch 42$b$3 is operated, the air volume of the air conditioner increases.

The switch 42$b$4 switches between ON and OFF of the cooling and heating functions. In the example of FIG. 8, when the cooling the switch 42$b$4 is operated, the cooling and heating functions are switched between ON and OFF.

The switches 42$b$5 and 42$b$6 are switches for adjusting the set temperature of the air conditioner. In the example of FIG. 8, the setting temperature is lowered when the switch 42$b$5 is operated, and the setting temperature is raised when the switch 42$b$6 is operated.

The switch 42$b$7 is a switch capable of switching the display of the engine operating time display area 41$f$.

The switches 42$a$2 to 42$a$6 and 42$b$2 to 42$b$6 are configured to be able to input numbers displayed on or near the respective switches. The switches 42$a$3, 42$a$4, 42$a$5, and 42$b$4 are configured to move the cursor left, up, right, and down, respectively, when the cursor is displayed on the menu screen.

Note that the functions provided to the switches 42$a$1 to 42$a$7 and 42$b$1 to 42$b$7 are examples, and the switches may be configured to be able to execute other functions.

As described above, when the tab 41$p$1 is selected in a state where the bird's-eye view image FV and the rear image CBT are displayed in the image display area 41$n$, the first menu detailed items are displayed in the tabs 41$p$2 to 41$p$7 in the state where the bird's-eye view image FV and the rear image CBT are displayed. Therefore, the operator can ascertain the first menu detailed items while ascertaining the bird's-eye view image FV and the rear image CBT.

Furthermore, the bird's-eye view image FV is displayed in the image display area 41$n$ without changing the size thereof before and after the tab 41$p$1 is selected. The visibility when the operator checks the surroundings of the shovel 100 does not deteriorate.

Figure 9:
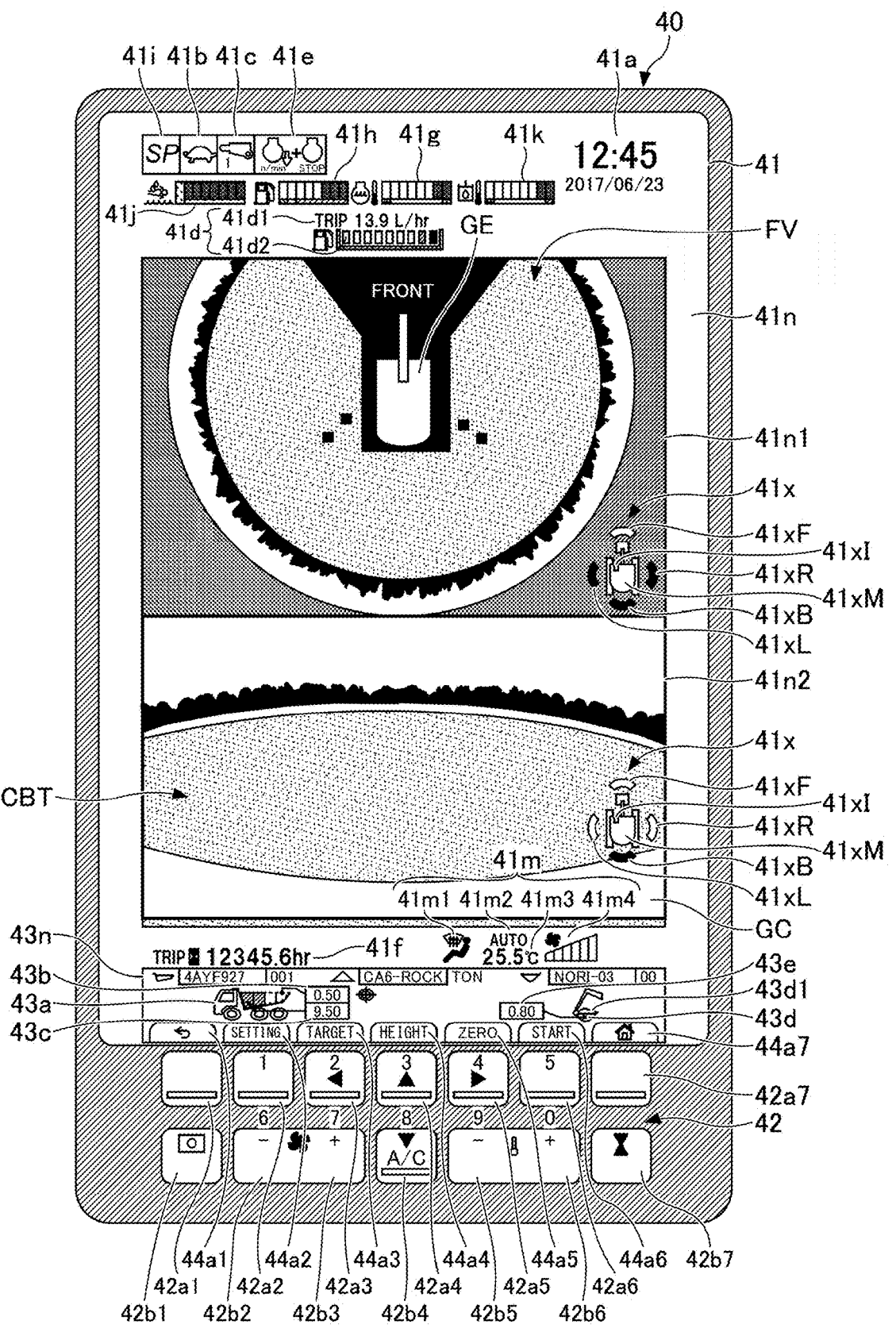
FIG. 9 is a diagram for illustrating an example of a loading work screen.

Hereinafter, the loading work screen of this embodiment will be described with reference to FIG. 9. FIG. 9 is a diagram for illustrating an example of the loading work screen. The loading work screen in FIG. 9 is displayed on the display device 40 in Step S703 of FIG. 7, for example. The loading work screen illustrated in FIG. 9 is a screen capable of transitioning to a screen for performing various settings in the loading work, in other words, is a home screen of the loading work.

In the example of FIG. 9, the loading work screen is displayed on the image display part 41. The image display part 41 includes the image display area 41$n$ and a work information display area 43$n$.

In the work information display area 43n, a load amount image 43a, a remaining load amount 43b, a loaded amount 43c, an icon image 43d of the bucket 6, and a bucket 6's earth and sand weight 43e are displayed. Icon images 44a1 to 44a7 are also displayed in the work information display area 43n.

The load amount image 43a includes an image of a side surface of the dump truck and a bar chart image indicating the loaded amount on the cargo bed of the dump truck. The bar chart image indicates the ratio of the amount of the earth and sand loaded on the cargo bed of the dump truck to the maximum load amount of the dump truck.

Furthermore, the bar chart image included in the load amount image 43a of this embodiment is provided with scale marks, and is displayed such that as the ratio of the loaded amount to the maximum load amount increases, the range of the ratio assigned to the interval between the scale marks is decreased.

Therefore, in this embodiment, as the ratio of the loaded amount to the maximum load amount increases, the change in the loaded amount is displayed in more detail.

The remaining load amount 43b is a numerical value indicating a difference between the maximum load amount and the current loaded amount. In other words, the remaining load amount 43b is the remaining weight of the earth and sand that can be loaded on the dump truck.

The loaded amount 43c is a numerical value indicating the amount of the load loaded on the cargo bed of the dump truck.

The icon image 43d is an image including an image 43d1 of the load in the bucket 6, and represents the presence or absence of the load in the bucket 6. In the example of FIG. 9, the icon image 43d includes the image 43d1, and it can be seen that the bucket 6 is loaded with a load in a state before dumping.

Furthermore, when the load (earth and sand) in the bucket 6 is dumped onto the cargo bed of the dump truck, the icon image 43d may be an image of only the bucket 6 not including the image 43d1. The display control part 66 may change the shape of the image 43d1 according to the weight of the load in the bucket 6.

The bucket 6's earth and sand weight 43e is a numerical value indicating the weight of the load in the bucket 6. That is, the weight 43e is the weight of the earth and sand to be dumped onto the dump truck.

For example, in a case where the weight 43e is larger than the remaining load amount 43b, that is, in a case where dumping earth and sand loaded onto the bucket 6 results in overloading, the display control part 66 of this embodiment may change the display mode for the load amount image 43a, the remaining load amount 43b, the loaded amount 43c, and the like. Specifically, the display control part 66 may set the display color of the load amount image 43a, the remaining load amount 43b, the loaded amount 43c, and the like to red or the like.

In a case where overloading does not occur even if earth and sand loaded onto the bucket 6 is dumped, the display control part 66 may set the background color of the load amount image 43a, the remaining load amount 43b, the loaded amount 43c, and the like to green or the like.

Furthermore, when the load on the cargo bed of the dump truck exceeds the maximum load, the display control part 66 may cause the display device 40 to display information for instructing the operator to scoop earth and sand out from the cargo bed.

Each of the icon images 44a1 to 44a7 is an icon image for displaying various input fields and the like in the work information display area 43n. The icon images 44a1 to 44a7 may be displayed so as to correspond to the switches 42a1 to 42a7, respectively.

For example, when the switch 42a1 corresponding to the icon image 44a1 is operated, the display control part 66 may transition the display of the image display part 41 from the loading work screen to the main screen. Also, when the switch 42a2 corresponding to the icon image 44a2 is operated, the display control part 66 may display various setting screens in the work information display area 43n.

Furthermore, when the switch 42a3 corresponding to the icon image 44a3 is operated, the display control part 66 may display the input field of the target value of the load amount in the loading work in the work information display area 43n.

The icon image 44a5 is the correcting icon image for the reference value and corresponds to the switch 42a5. When the switch 42a5 is selected on the loading work screen, the reference value correction part 67 of this embodiment corrects the reference value used to calculate the weight of the load on the bucket 6. In other words, when the switch 42a5 is selected, the reference value correction part 67 performs the processing of Step S708 in FIG. 7.

As described above, in this embodiment, on the home screen of the loading operation, the image data captured by the imaging device S6 and the correction icon image corresponding to the switch corresponding to the correction of the reference value in the calculation of the weight of the load in the bucket 6 are displayed together.

Furthermore, in this embodiment, only in a case where it is determined that the bucket 6 is in the empty state, the display mode of the correction icon image is changed, and the operator is notified of the timing for correcting the reference value.

Specifically, the icon image 44a5 may be grayed out in a case where it is not determined that the bucket 6 is in the empty state, that is, a case where it is determined that the bucket 6 is in the state after excavation (before dumping). Note that, in such a case, the display mode of the icon image 44a5 is not limited to the gray-out display, and any display mode is acceptable as long as the display mode is different from the display mode of the icon image indicating that the selection of the corresponding switch is valid among the other icon images 44a1 to 44a7.

Furthermore, in a case where it is determined that the bucket 6 is in the empty state, the icon image 44a5 is changed from the gray-out display to the display mode indicating that the selection of the switch 42a5 is valid. Specifically, the icon image 44a5 may be displayed as a color image, or may be displayed in the same display mode as the display mode of the icon image indicating that the selection of the corresponding switch is valid among the icon images 44a1 to 44a7.

As described above, in this embodiment, the icon image 44a5 (correction icon image) corresponding to the switch 42a5 for instructing the correction of the reference value used for calculation of the weight of the load on the bucket 6 is displayed together with the image data acquired by the imaging device S6 on the home screen of the loading work.

Furthermore, in this embodiment, in a case where it is determined that the bucket 6 is in the empty state, the display mode of the correction icon image 44a5 is changed. Then, the operator of the shovel 100 is notified that it is time to correct the reference value.

When the display mode of the correction icon image 44a5 is changed, the operator can correct the reference value only by selecting the switch 42a5. In other words, when the display mode of the correction icon image 44a5 is changed, the operator can set the weight of the bucket 6 in the empty load state only by selecting the switch 42a5. Therefore, according to this embodiment, the weight of the end attachment in the empty load state can be set.

Note that the timing at which the reference value is corrected may be notified to the operator by a method other than the method of changing the display mode of the correction icon image 44a5. For example, the timing at which the correction of the reference value is performed may be notified by voice, or may be notified by displaying a message prompting the correction of the reference value, or the like. In such a case, the display device 40 may include, for example, an output part that outputs a notification indicating that it is time to correct the reference value by a method other than display.

Furthermore, for example, although the controller 30 is mounted on the shovel 100 in the above-described embodiment, the controller 30 may be installed outside the shovel 100. In such a case, the controller 30 may be, for example, a control device installed in a remote control room. The display device 40 may also be installed in the remote control room. The display device 40 may then be connected to the control device installed in the remote control room. The control device installed in the remote control room may receive output signals from various sensors attached to the shovel 100, calculate the weight of the load, and determine the timing for correcting the reference value used for calculation of the weight of the load. Furthermore, for example, in the above-described embodiment, the display device 40 may function as a display part in the assist device 200. In such a case, the assist device 200 may be connected to the controller 30 of the shovel 100 or the control device installed in the remote control room.

In each of the above-described embodiments, the shovel 100 including the bucket as the end attachment has been described as an example. It is, however, not limited to the shovel 100 including the bucket. The shovel of the present disclosure also includes a work machine provided with a grapple, a lifting magnet, or the like as an end attachment at the tip of an attachment.

This embodiment has been described above with reference to specific examples. However, the present disclosure is not limited to these specific examples. Modifications to these specific examples by those skilled in the art are also included in the scope of the present disclosure as long as they include the features of the present disclosure. Each element included in each specific example described above and the arrangement, condition, shape, and the like thereof are not limited to those illustrated and can be appropriately changed. The elements included in the specific examples described above may be appropriately combined as long as no technical contradiction occurs.

What is claimed is:

1. A display device for a shovel, wherein:
the display device is configured to display a screen that includes
an image display area displaying an image represented by image data captured by an imaging device included in the shovel; and
a work information display area displaying an icon image corresponding to an instruction to correct a reference value used to calculate a weight of a load object conveyed by an end attachment of the shovel, and
a display mode of the icon image is changed to notify an operator of the shovel that an operation of correcting the reference value is permitted, when a state of the end attachment satisfies a predetermined condition.

2. A display device for a shovel, wherein
the display device is configured to display a screen that includes
an image represented by image data captured by an imaging device included in the shovel; and
an icon image corresponding to an instruction to correct a reference value used to calculate a weight of a load object conveyed by an end attachment of the shovel,
a display mode of the icon image is changed to a display mode indicating that an operation of correcting the reference value is permitted, when a state of the end attachment satisfies a predetermined condition, and
the display mode of the icon image is displayed in a display mode indicating that the operation of correcting the reference value is invalid, when the state of the end attachment does not satisfy the predetermined condition.

3. The display device according to claim 2, wherein the predetermined condition is that the state of the end attachment is determined to be an empty load state.

4. The display device according to claim 3, wherein the predetermined condition is that a difference between a weight of the end attachment and the reference value is less than or equal to a predetermined threshold value.

5. The display device according to claim 4, wherein
an operation of setting the reference value is an operation of selecting an input device associated with the icon image, and
when the operation is performed, the weight of the end attachment when the predetermined condition is satisfied is set as the reference value.

6. The display device according to claim 5, wherein the screen is displayed in loading of the load object onto a cargo bed of a conveying vehicle from the end attachment.

7. The display device according to claim 6, wherein
the display device is configured to display another screen, said another screen including the image data captured by the imaging device and an icon image for displaying the screen, and
said another screen transitions to the screen when an input device corresponding to the icon image for displaying the screen is selected.

8. The display device according to claim 7, wherein
the screen is a loading work screen,
said another screen is a main screen,
the icon image for displaying the screen is an icon image for transitioning the main screen to the loading work screen, and
the input device corresponding to the icon image for displaying the screen is an input device corresponding to a tab displaying the icon image for transitioning the main screen to the loading work screen.

9. The display device according to claim 1, wherein the work information display area displays information on loading work.

10. The display device according to claim 9, wherein a load amount image, a remaining load amount, a loaded amount, an icon image of the end attachment, and a weight of earth and sand in the end attachment are displayed in the work information display area.

11. The display device according to claim 10, wherein the load amount image includes an image of a side surface of a dump truck, and a bar chart image indicating a loaded amount on a cargo bed of the dump truck, and the bar chart image indicates a ratio of the loaded amount of earth and sand on the cargo bed of the dump truck to a maximum load amount of the dump truck.

12. A shovel comprising:

an upper swing body;

a lower traveling body;

an end attachment;

an imaging device;

a hardware processor configured to calculate a weight of a load object conveyed by the end attachment; and a display device configured to display a screen that includes an image display area displaying an image represented by image data captured by the imaging device, and a work information display area displaying an icon image corresponding to an instruction to correct a reference value used to calculate the weight of the load object conveyed by the end attachment, wherein the hardware processor is configured to change a display mode of the icon image upon determining a timing of correction of the reference value used to calculate the weight of the load object, and the hardware processor is configured to determine whether the end attachment is empty based on an output of a sensor of the shovel, and change the display mode of the icon image to notify an operator of the shovel that the correction of the reference value is allowed, in response to determining that the end attachment is empty.

13. The display device according to claim 1, wherein the display device is configured to simultaneously display the image represented by the image data and the icon image on the same screen.

14. The display device according to claim 1, wherein the image represented by the image data captured by the imaging device includes at least one of a bird's eye view image, a front side image, a rear side image, a left side image, and a right side image of the shovel.

15. The shovel according to claim 12, wherein the display device is configured to simultaneously display the image represented by the image data and the icon image on the same screen.

16. The shovel according to claim 12, wherein the image represented by the image data captured by the imaging device includes at least one of a bird's eye view image, a front side image, a rear side image, a left side image, and a right side image of the shovel.

17. The shovel according to claim 12, wherein the hardware processor is configured to prohibit the correction of the reference value in response to determining that the end attachment is not empty.

18. The shovel according to claim 12, further comprising:

an attachment including a boom attached to the upper swing body, an arm attached to the boom, and the end attachment attached to the arm; and a boom cylinder configured to drive the boom, wherein the hardware processor is configured to calculate a weight of the end attachment based on a thrust of the boom cylinder, determine whether a difference between the weight of the end attachment and the reference value is less than or equal to a predetermined threshold value, and determine that the end attachment is empty in response to determining that the difference between the weight of the end attachment and the reference value is less than or equal to the predetermined threshold value.

* * * * *